United States Patent
Brehmer et al.

(10) Patent No.: US 10,959,404 B2
(45) Date of Patent: *Mar. 30, 2021

(54) ANIMAL FEEDER APPARATUS

(71) Applicant: BREHMER MANUFACTURING, Lyons, NE (US)

(72) Inventors: Jamie Brehmer, Lyons, NE (US); Joey Brehmer, Lyons, NE (US)

(73) Assignee: Brehmer Manufacturing, Lyons, NE (US)

(*) Notice: Subject to any disclaimer, the term of this patent is extended or adjusted under 35 U.S.C. 154(b) by 0 days.

This patent is subject to a terminal disclaimer.

(21) Appl. No.: 16/284,711

(22) Filed: Feb. 25, 2019

(65) Prior Publication Data
US 2019/0239473 A1 Aug. 8, 2019

Related U.S. Application Data

(63) Continuation-in-part of application No. 15/889,351, filed on Feb. 6, 2018, now Pat. No. 10,694,718.

(51) Int. Cl.
*A01K 5/02* (2006.01)
*A01K 5/01* (2006.01)

(52) U.S. Cl.
CPC ............... *A01K 5/025* (2013.01); *A01K 5/01* (2013.01); *A01K 5/0233* (2013.01)

(58) Field of Classification Search
CPC .... A01K 5/025; A01K 5/0225; A01K 5/0233; A01K 5/0241; A01K 39/012; A01K 39/0125; A01K 5/01; A01M 31/008

See application file for complete search history.

(56) References Cited

U.S. PATENT DOCUMENTS

| 4,040,389 | A | | 8/1977 | Walters |
| 4,131,082 | A | | 12/1978 | Sollars |
| 4,351,274 | A | | 9/1982 | Pannier |
| 4,377,130 | A | | 3/1983 | Schwieger |
| 4,660,508 | A | | 4/1987 | Kleinsasser |
| 4,694,780 | A | * | 9/1987 | Keuter ................ A01K 5/0241 119/53.5 |
| 4,719,875 | A | | 1/1988 | Van Gilst |
| 4,790,266 | A | | 12/1988 | Kleinsasser |
| 4,911,727 | A | | 3/1990 | King |
| 5,010,849 | A | | 4/1991 | Kleinsasser |
| 5,036,798 | A | | 8/1991 | King |

(Continued)

*Primary Examiner* — Magdalena Topolski
*Assistant Examiner* — Katelyn T Trong
(74) *Attorney, Agent, or Firm* — Jeffrey A. Proehl; Woods, Fuller, Shultz & Smith, P.C.

(57) ABSTRACT

An animal feeder apparatus including a feed hopper defining an interior for receiving a quantity of feed, an upper opening and a lower feed discharge opening. A feed shelf may be located below the feed hopper and have an upper feed support surface with at least a portion of the upper feed support surface being located directly below the feed discharge opening of the feed hopper. A feed trough may be located toward the bottom of the apparatus below the feed hopper and below the feed shelf, and form a lower feed support surface upon which feed falling from the hopper and shelf rests. A feed shelf movement assembly may be configured to permit a feeding animal to move the feed shelf from a location adjacent to the lower feed support surface of the feed trough.

21 Claims, 22 Drawing Sheets

(56) References Cited

U.S. PATENT DOCUMENTS

| | | |
|---|---|---|
| 5,272,998 A | 12/1993 | Pannier |
| RE34,494 E | 1/1994 | Kleinsasser |
| 5,351,649 A | 10/1994 | Rovira Badia |
| 5,558,039 A | 9/1996 | Zimmerman |
| 5,595,139 A | 1/1997 | Hofer |
| 5,603,285 A | 2/1997 | Kleinsasser |
| 5,850,805 A | 12/1998 | Kleinsasser |
| 5,921,200 A | 7/1999 | Bondarenko |
| 5,967,083 A | 10/1999 | Kleinsasser |
| 6,253,705 B1 | 7/2001 | Pollock |
| 6,923,142 B2 | 8/2005 | Kleinsasser |
| 7,549,393 B2 | 6/2009 | Kleinsasser |
| 7,832,356 B2 | 11/2010 | Kleinsasser |
| 8,459,204 B2 | 6/2013 | Lato |
| 8,899,178 B2 | 12/2014 | Bondarenko |
| 2008/0276873 A1* | 11/2008 | Waldner ............... A01K 5/0216 119/51.5 |
| 2010/0229799 A1* | 9/2010 | Brehmer ............. A01K 5/0216 119/53.5 |
| 2014/0130746 A1* | 5/2014 | Kleinsasser ............. A01K 5/00 119/51.5 |

\* cited by examiner and recited in the abstract. It is important, therefore, that the claims be regarded as including such equivalent constructions insofar as they do not depart from the spirit and scope of the present disclosure.

ANIMAL FEEDER APPARATUS

REFERENCE TO RELATED APPLICATION

This application is a continuation-in-part of U.S. Non-provisional patent application Ser. No. 15/889,351 filed Feb. 6, 2018, which is hereby incorporated by reference in its entirety.

BACKGROUND

Field

The present disclosure relates to livestock feeders and more particularly pertains to a new animal feeder apparatus for effectively providing feed to animals during multiple life stages while minimizing difficulties associated with the operation of the apparatus.

Description of the Prior Art

A variety of feeder configurations have been used by hog producers. Many of these feeders are designed to accommodate the animals from the wean stage to the finish stage of the production cycle.

One feeder configuration, known as a tray feeder, includes a feeding tray located between an upper hopper and a lower trough. One illustrative example of a tray feeder is shown in U.S. Pat. No. 4,660,508 issued Apr. 28, 1987 to Kleinsasser. The feeding tray is vertically movable to adjust its proximity to the bottom opening of the upper hopper to regulate the amount of feed that passes from the hopper into the lower trough, thereby ensuring proper feed flow and reducing feed wastage. The lower trough below the adjustable tray catches any excess feed spilled from the tray. Feeding hogs primarily eat from the feeding tray and use their snouts to push the tray in a (single) lateral direction away from the hog to cause the feed to pass from the upper hopper downward onto the feeding tray.

Another common type of hog feeder, known as a paddle feeder, has an upper hopper and a lower trough, and lacks the feeding tray of the tray feeder. An illustrative example of a tray feeder is shown in U.S. Pat. No. 5,921,200 issued Jul. 13, 1999 to Bondarenko et al. The flow of feed is regulated by a combination of components including a gate that is adjustable to control the size of a gate opening and thereby control the flow of feed from the hopper, a plurality of pivoting levers, and a plurality of pivoting sweepers to encourage feed flow out of the hopper. The adjustable gate is used to limit the maximum amount of feed that can pass from the upper hopper to the lower trough. The movement of feed out of the hopper is encouraged by the movement of the sweepers located in the upper hopper, and movement of the sweepers is caused by the levers located in the trough and connected to the sweepers. The hogs use their snouts to move the levers in a (single) sideways direction which in turn causes the sweepers in the hopper to rotate to encourage feed to pass through the gate opening and down into the lower trough.

SUMMARY

In one aspect, the present disclosure relates to an animal feeder apparatus having a top, a bottom, opposite ends, and opposite sides. The apparatus may be elongated in a longitudinal direction between the opposite ends and have a lateral direction between the opposite sides. The animal feeder apparatus may comprise a feed hopper defining an interior for receiving a quantity of feed, with the feed hopper having an upper opening and a lower feed discharge opening. The apparatus may also include a feed shelf located below the feed hopper, with the feed shelf having an upper feed support surface with at least a portion of the upper feed support surface being located directly below the feed discharge opening of the feed hopper. The apparatus may further include a feed trough located toward the bottom of the apparatus below the feed hopper and below the feed shelf, with the feed trough forming a lower feed support surface upon which feed falling from the hopper and shelf rests. The apparatus may also have a feed shelf movement assembly configured to permit a feeding animal to move the feed shelf from a location adjacent to the lower feed support surface of the feed trough.

In another aspect, the disclosure relates to an animal feeder apparatus having a top, a bottom, opposite ends, and opposite sides, the apparatus being elongated in a longitudinal direction between the opposite ends and having a lateral direction between the opposite sides. The animal feeder apparatus may comprise a feed hopper defining an interior for receiving a quantity of feed, with the feed hopper having an upper opening and a lower feed discharge opening. The apparatus may also include a feed shelf located below the feed hopper and having an upper feed support surface with at least a portion of the upper feed support surface being located directly below the feed discharge opening of the feed hopper. The feed shelf may be movable with respect to the feed hopper in the longitudinal direction of the feeder apparatus and the lateral direction of the feeder apparatus. The apparatus may also include a feed trough located toward the bottom of the apparatus below the feed hopper and below the feed shelf, with the feed trough forming a lower feed support surface upon which feed falling from the hopper and shelf rests. The apparatus may further include a feed shelf movement assembly configured to permit a feeding animal to move the feed shelf from a location adjacent to the lower feed support surface of the feed trough. The feed shelf movement assembly is actuatable by the feeding animal while consuming feed from the lower feed support surface of the feed trough to move the feed shelf in the longitudinal direction of the feeder apparatus without requiring a feeding animal to directly contact the feed shelf.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
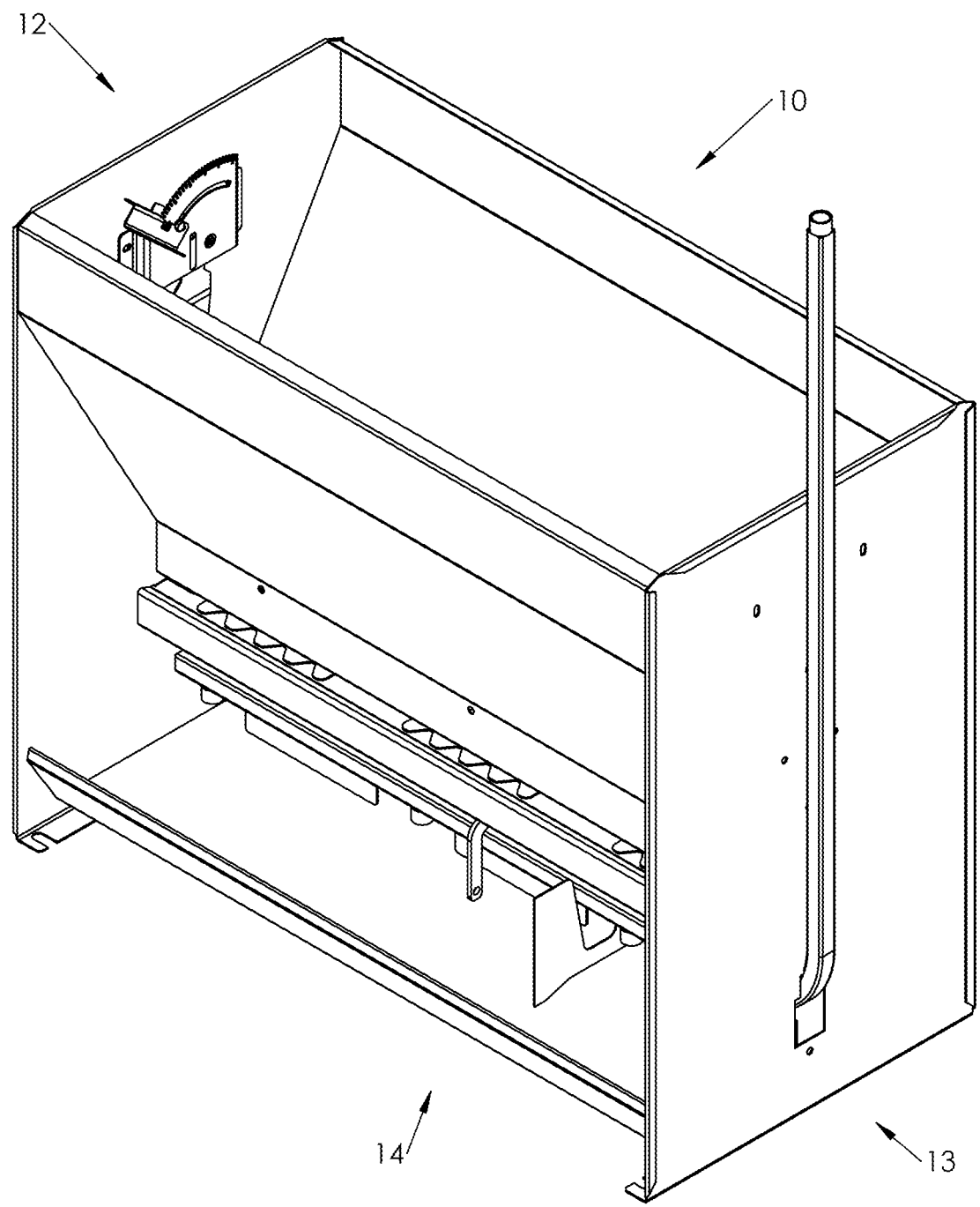
FIG. 1 is a schematic perspective view of a new animal feeder apparatus according to the present disclosure.
Figure 2:
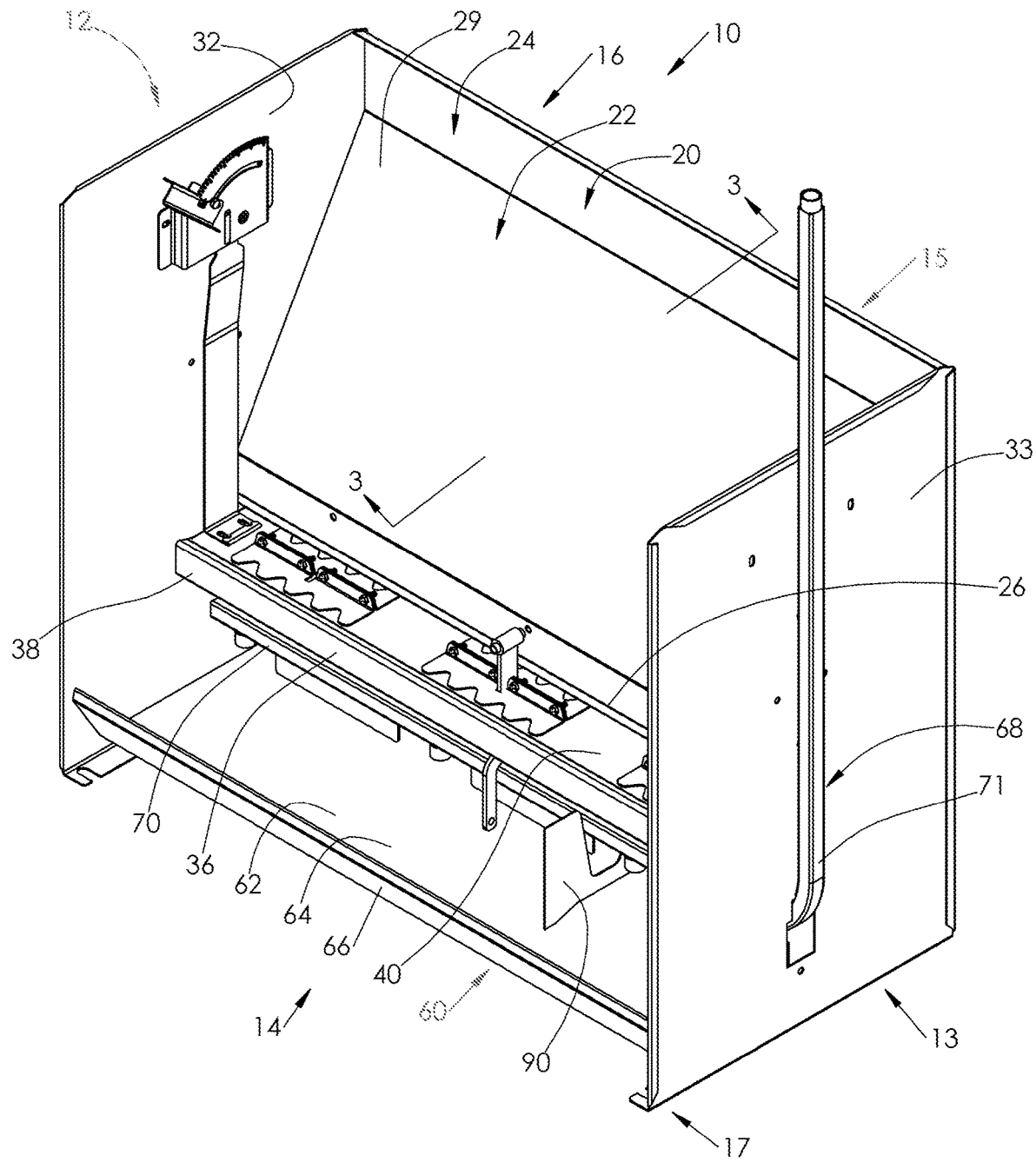
FIG. 2 is a schematic perspective view of the apparatus with portions, including one of the hopper walls, removed to reveal detail of the apparatus, according to an illustrative embodiment.
Figure 3:
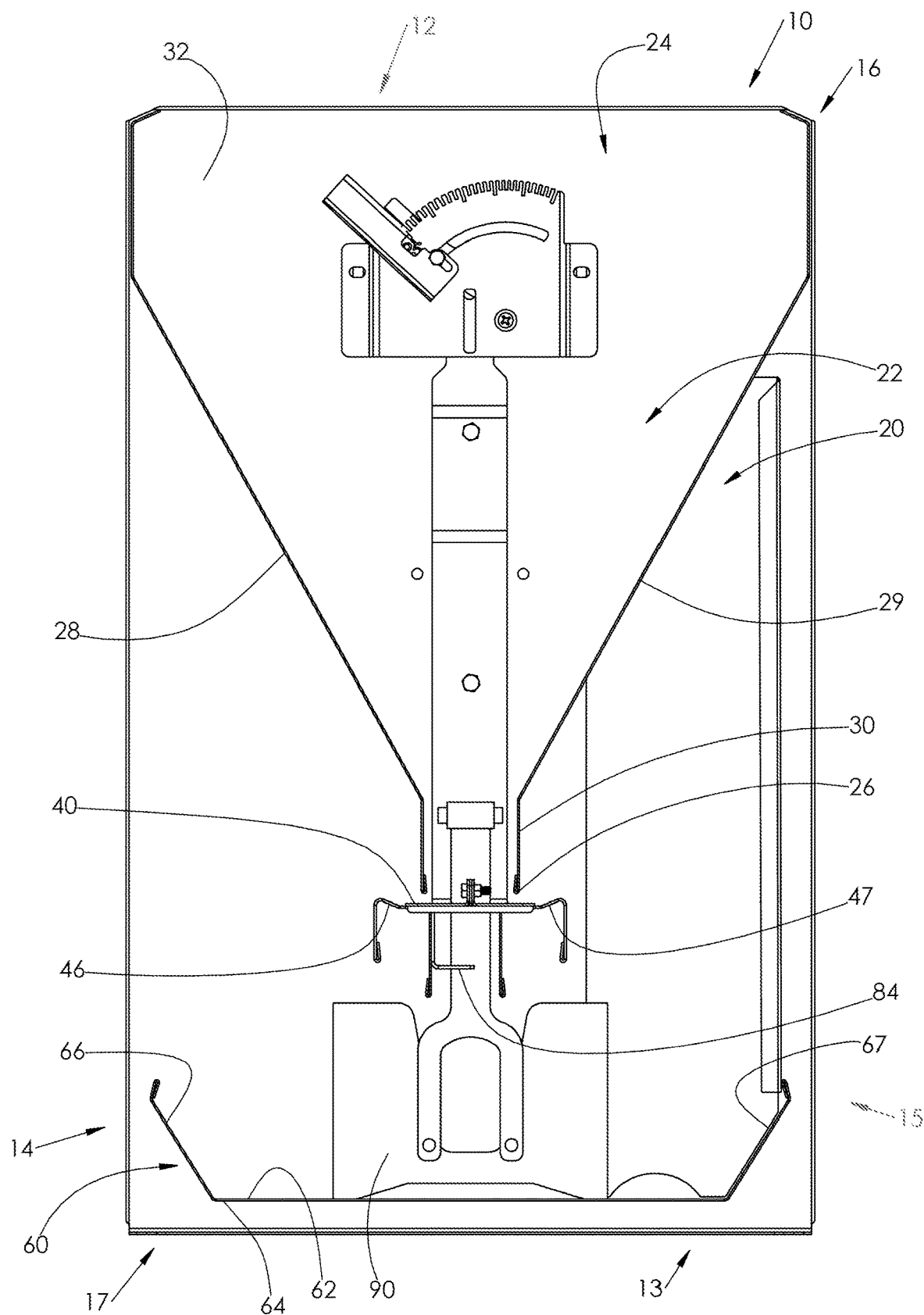
FIG. 3 is a schematic sectional view of the apparatus taken along line 3-3 of FIG. 2, according to an illustrative embodiment.
Figure 4:
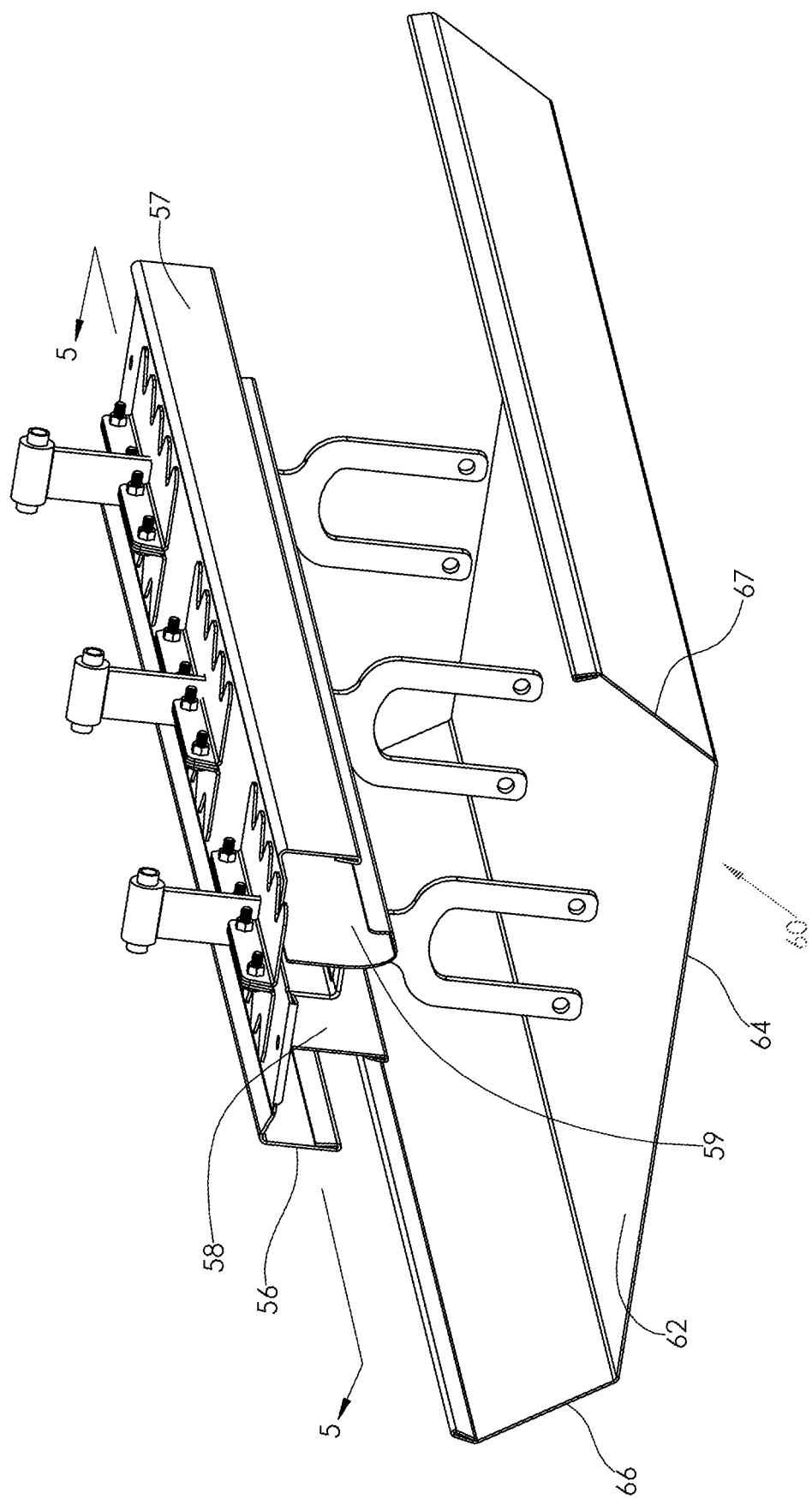
FIG. 4 is a schematic perspective view of elements of the apparatus including the feed trough, the feed shelf, and the feed shelf moving assembly, according to an illustrative embodiment.
Figure 5:
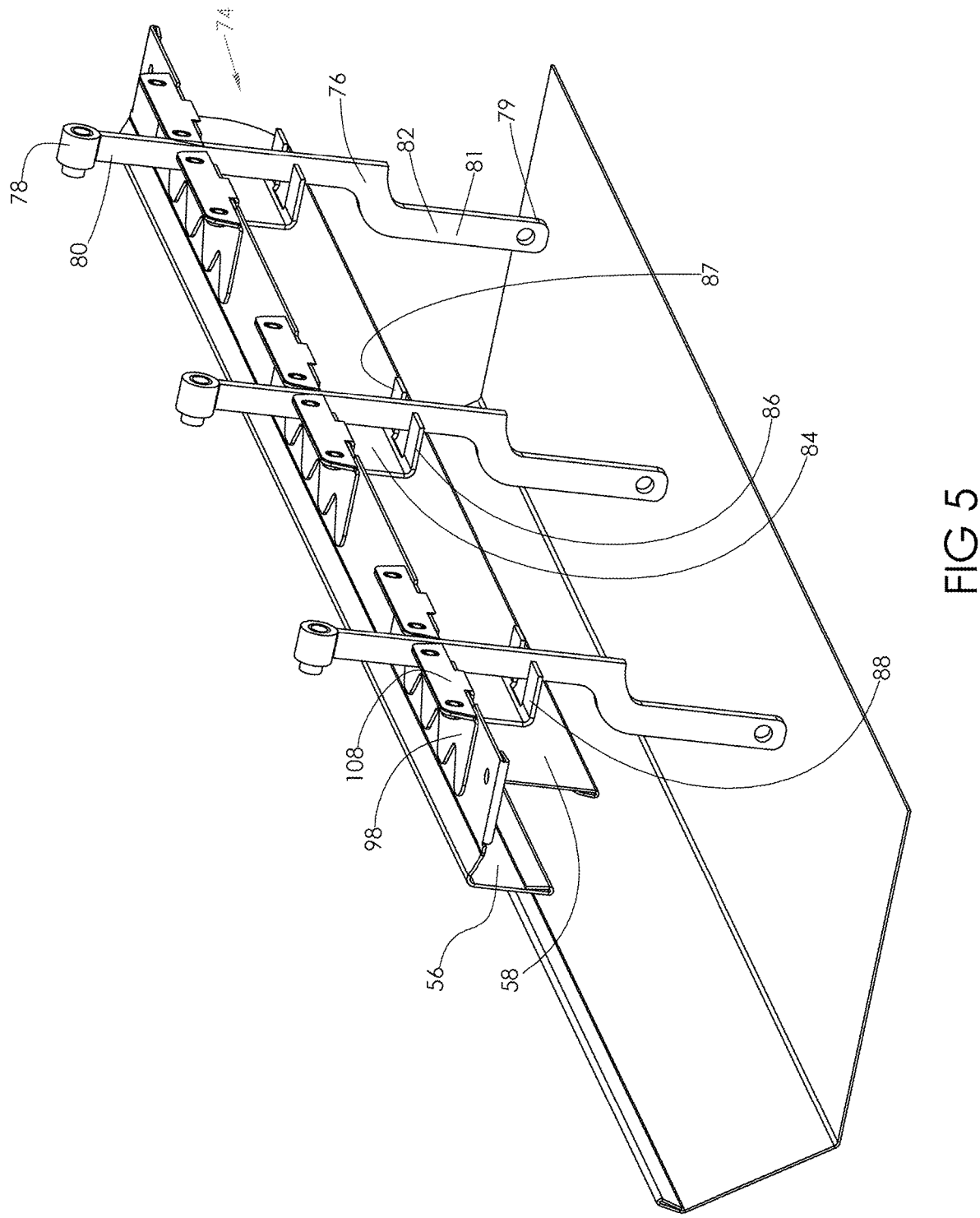
FIG. 5 is a schematic perspective sectional view of the elements of the apparatus shown in FIG. 4 taken along line 5-5 of FIG. 4, according to an illustrative embodiment.
Figure 6:
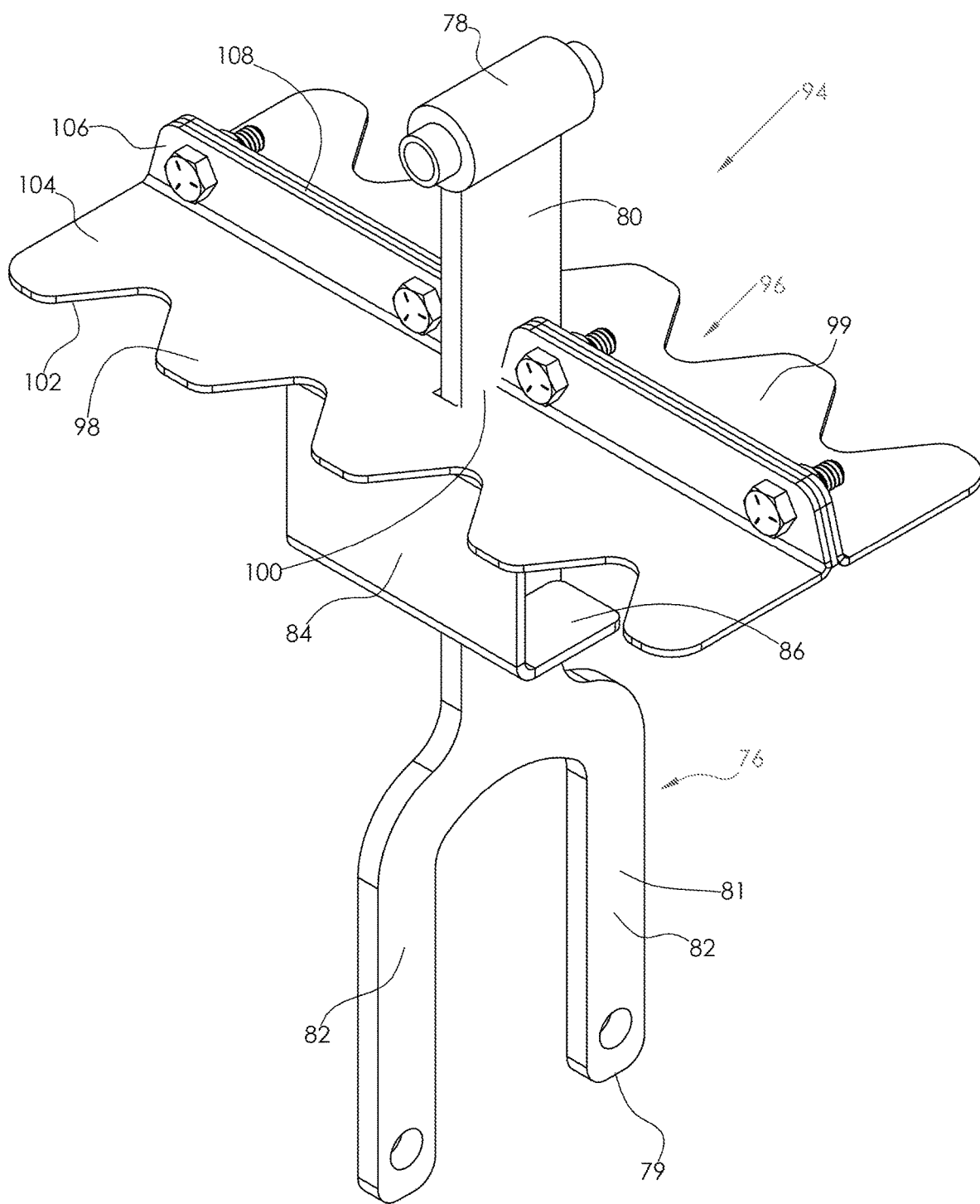
FIG. 6 is a schematic perspective view of elements of the apparatus including the feed shelf movement assembly and feed sweeper assembly, according to an illustrative embodiment.
Figure 7:
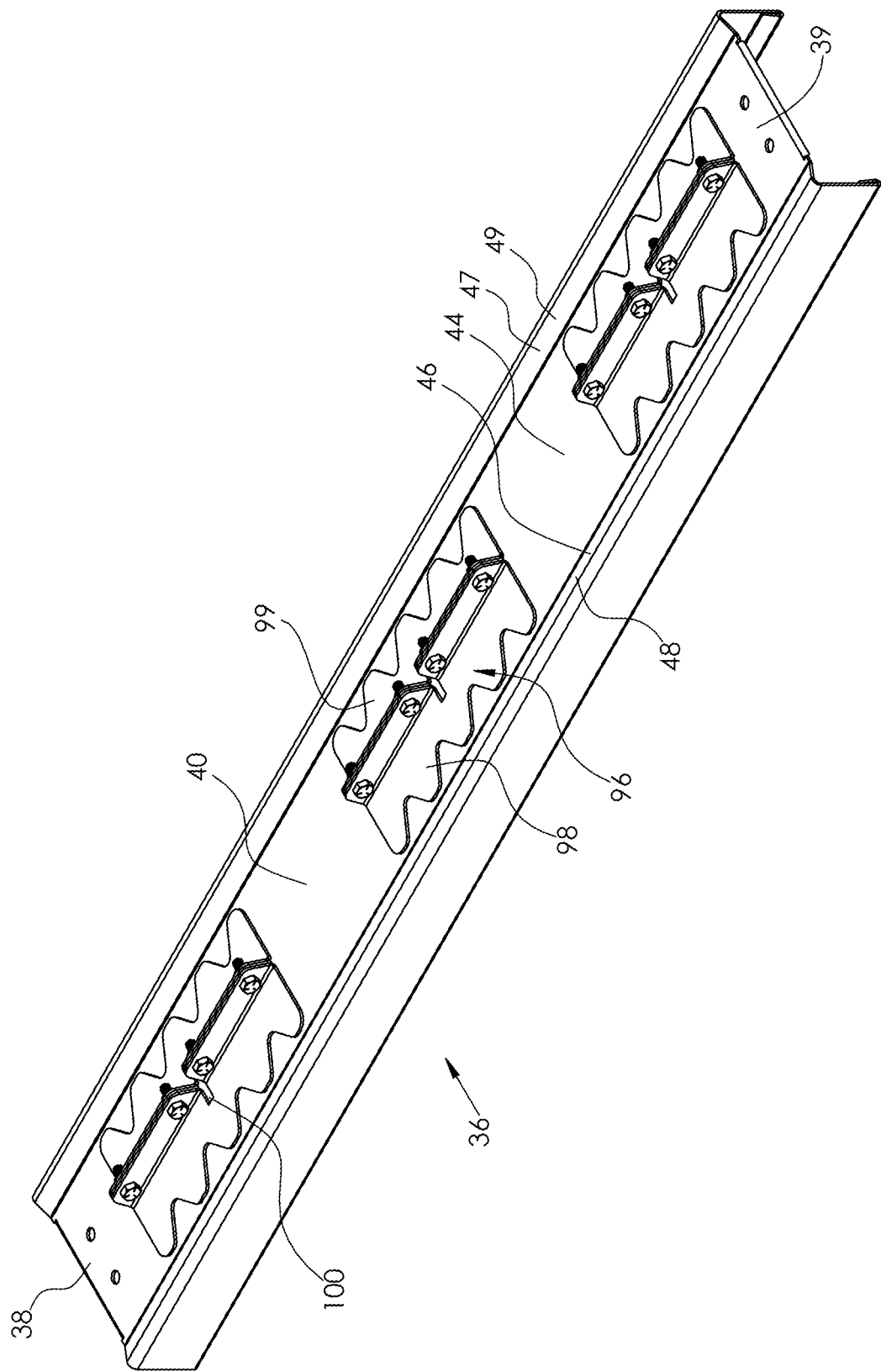
FIG. 7 is a schematic perspective view of elements of the apparatus including the feed shelf and the feed sweeper assembly, according to an illustrative embodiment.
Figure 8:
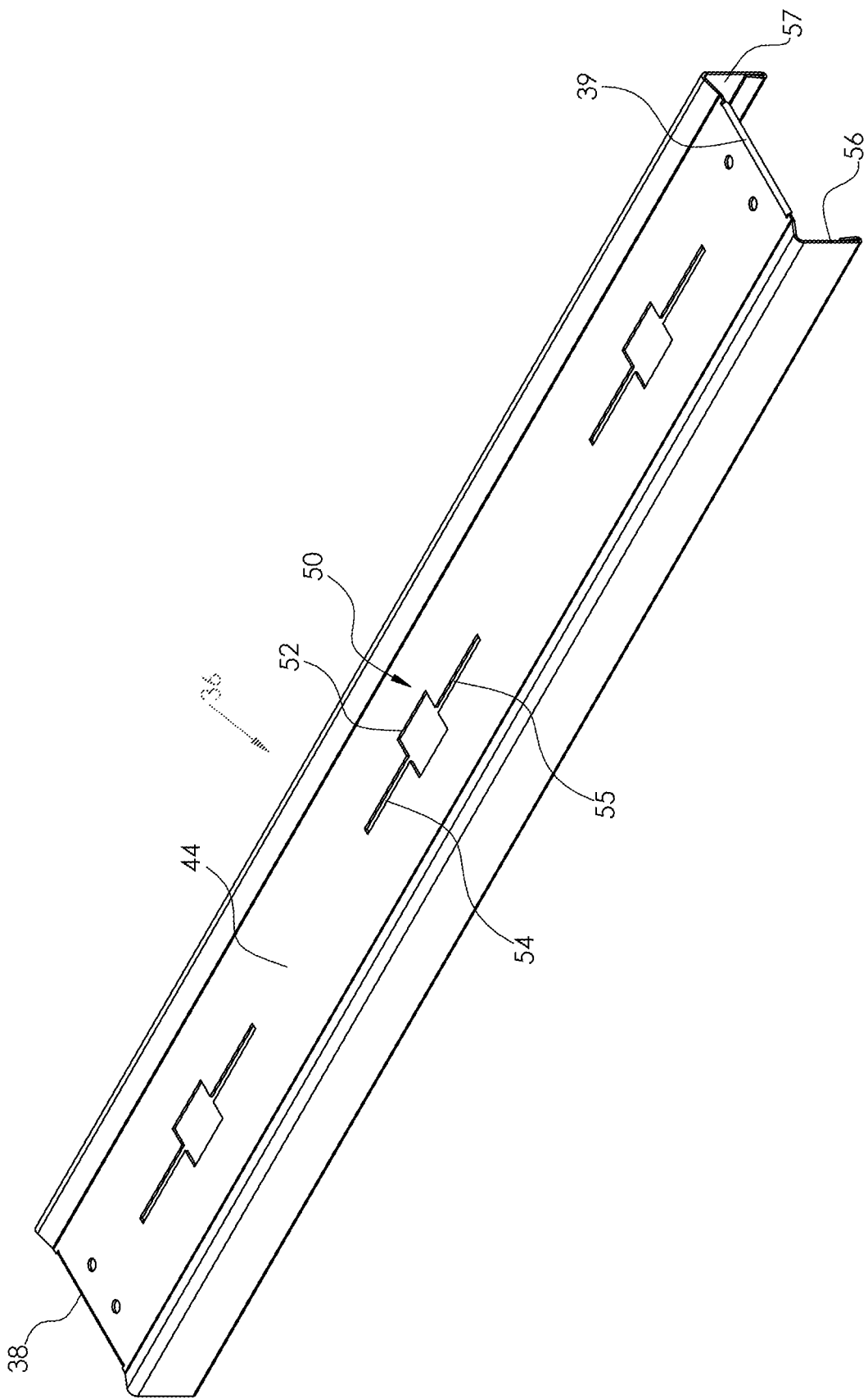
FIG. 8 is a schematic perspective view of the feed shelf of the apparatus, according to an illustrative embodiment.

With reference now to the drawings, and in particular to FIGS. 1 through 23 thereof, a new animal feeder apparatus embodying the principles and concepts of the disclosed subject matter will be described.

The applicants have recognized that the known types of feeders have disadvantages that affect the optimal performance of the feeders.

In the case of the tray feeder, the height of the feeding tray above the lower trough often makes it difficult for smaller, newly weaned pigs to reach the feed tray and the feed located thereon. As a result, smaller pigs are only able to reach any feed that falls from the primary feeding location on the feed tray to the lower trough and are unable to push on the feed tray to dispense more feed from the hopper. This is especially problematic when a number of animals are simultaneously competing for feed space at the feeder. Even though some feed does fall onto the lower trough, it is often an insufficient amount to satisfy the feeding requirements of the animals.

Another drawback associated with tray feeders is the clogging of the flow of feed from the upper hopper to the feed tray when the feed becomes packed or agglomerates between the tray and the hopper due to moisture accumulating on the tray edges while the animals are feeding. This condition impacts the ability of feed to flow from the hopper to the tray, thereby causing an insufficient amount of feed to be available to the animals.

Yet another drawback for the tray feeder arises when the consistency of the feed rations for the animals is changed, such as when changed between fine and coarse consistencies. In such situations, the gap between the upper hopper and feeding tray needs to be regularly monitored and adjusted to ensure that adequate feed flow is occurring. For example, a fine feed consistency to feed younger hogs requires less tray gap, while a coarser feed blend for older hogs needs a greater tray gap. However, a feed gap that is too narrow for the feed being dispensed will cause the feeder to clog and inhibit the flow of feed, and a feed gap that is too wide will allow too much feed to pass onto the tray and result in feed being wasted.

Still another drawback is that the feed flow from a tray feeder can only be prompted by the hog through movement of the feed tray in a single (lateral) direction away from the feeding hog, which limits the ability of the animal to cause additional feed to be dispensed from the hopper.

In the case of the paddle feeder, there are also a number of disadvantages for the animals and the hog producer. For example, during the initial filling of the hopper when the paddle feeder is empty, the feed tends to run past the sweeper and fill the lower trough before the upper hopper becomes full, thus causing feed wastage.

Further, any type of agglomerations of feed, or even coarser feed, may plug the gate and not permit feed to flow out of the hopper. Unlike the tray feeder, the feed held by a paddle feeder is not readily visible to an observer without looking directly into the upper hopper. This often causes the hog producer to spend more time inspecting the feeder to ensure that sufficient feed is available to the animals. In the event that the feeder is clogged, the inability to see the feed at the bottom of the hopper prevents the operator from easily identifying what is causing the feed flow stoppage. This inability often prompts the hog producer to dig around inside the upper hopper to try to identify what is causing the feeder to plug.

Similar to the tray feeder, the paddle feeder is also subject to problems caused by the feed consistency. Even relatively minor changes in the consistency of the feed ration dictates the need to regularly monitor and adjust the feeder to ensure that adequate feed flow is present.

The applicants have recognized that there is a need for a feeder apparatus that addresses the problems identified above for the animal and the producer. The applicants have thus developed a feeding apparatus that minimizes feed related issues regarding animal accessibility, feed availability, and feed visibility concerns associated with traditional tray and paddle type hog feeders. The apparatus may reduce feed blockage, feed packing and feed waste issues associated with the traditional tray and paddle type hog feeders. The apparatus of the disclosure may utilize improvements in feed agitation methods that promote consistent feed flow from the upper hopper to the feeding tray as well as the lower trough.

The feed apparatus may include a secondary means of feed agitation that agitates the feed in multiple directions to facilitate movement of the feed off of the feed tray, discourage feed from packing onto the edges of the feeding tray, and reduce plugging or feed wastage as an improvement over conventional hog feeders.

The applicants have recognized the advantages of and have developed a feeder apparatus that facilitates feeding from the feed trough by younger or smaller pigs by providing mechanisms for encouraging the dispensing of feed from the feed hopper and the feed shelf that are accessible at the feed trough by smaller pigs, as well as providing the feed shelf from which more mature and larger pigs may also feed. The applicants have also recognized the advantages of and have developed a feeder apparatus that facilitates the dispensing of feed by providing mechanisms for causing the movement of feed resting on the feed shelf to discourage accumulations and help break up agglomerations of feed at the feed shelf or alleviate other feed flow problems caused by changes in the consistency of the feed rations. The feed apparatus developed by the applicants provides the hog producer with enhanced visibility of the dispensing feed on the feed shelf to spot feed flow problems if they should develop.

In one aspect, the disclosure relates to an animal feeder apparatus 10 which may be elongated with opposite ends 12, 13 as well as opposite sides 14, 15 which generally extend between the ends 12, 13. The elongated apparatus 10 may have a longitudinal direction between the opposite ends 12, 13, and may have in a lateral direction between the opposite sides 14, 15 which is oriented substantially perpendicular to the longitudinal direction. At least one of the sides 14, 15 may be configured for an animal to obtain feed, and in most embodiments both of the sides are configured for animals to obtain feed. The feeder apparatus 10 may also have a top 16, and a bottom 17 for resting upon a floor or ground surface.

In greater detail, the animal feeder apparatus 10 may include a feed hopper 20 which defines an interior 22 for receiving a quantity of feed to be provided to the feeding animal. The feed hopper 20 may be elongated between the ends 12, 13 of the apparatus, and may have an upper opening 24 into which a supply of feed may be introduced into the interior 22. The feed hopper 20 may also have a feed discharge opening 26 through which feed contained in the interior 22 of the hopper exits the hopper to be provided to the feeding animal. The feed discharge opening 26 may be elongated to extend between the ends 12, 13 of the apparatus, and may be located generally below the upper opening 24.

The feed hopper 20 may be formed by a pair of hopper walls 28, 29 which generally extend from the top 16 of the apparatus toward the bottom 17 of the apparatus. The walls 28, 29 may generally converge toward each other toward the bottom of the apparatus and diverge away from each other toward the top 16. In some embodiments, each of the hopper walls 28, 29 may have a neck portion 30 which forms a necked section of the interior 22 of the feed hopper. The neck portions 30 of the hopper walls may be oriented substantially parallel to each other, and the feed discharge opening 26 may be located at the bottom of the necked section. The feed hopper 20 may also include a pair of end walls 32, 33 positioned toward the respective ends 12, 13 of the apparatus 10. The end walls 32, 33 may extend between the hopper walls 28, 29 to define the interior 22 of the feed hopper with the walls 28, 29. The end walls 32, 33 may be oriented substantially parallel to each other and may also be oriented substantially vertically with respect to the floor on which the apparatus 10 rests.

In some embodiments, the feed hopper 20 may also include a pair of diverter walls 34 (see, for example, FIGS. 15, 16 and 23) with each diverter wall being located towards a respective end wall 32, 33 of the feed hopper so that the diverter walls are positioned in substantial opposition to each other. The diverter walls 34 may further be positioned in the neck portion 30 of the hopper, and each diverter wall may form an end of the feed discharge opening 26. Significantly, each of the diverter walls 34 may extend upwardly from the feed discharge opening 26 and outwardly from the discharge opening 26 toward the respective end wall 32, 33 of the hopper to slightly narrow the neck portion 30 of the hopper toward the feed discharge opening and guide the flow of feed in the hopper away from the ends of the hopper when the feed ultimately exits the hopper interior 22 through the feed discharge opening 26. Further, in some embodiments, end sections of the neck portion 30 of each hopper wall 20, 29 may be removed or omitted from the respective hopper wall to form a dog-eared edge 35 of the respective hopper wall that extends downwardly and inwardly from the end wall 32, 33 of the hopper to the feed discharge opening 26. The dog-eared edge 35 may be aligned with the diverter wall 34 adjacent to the edge 35, although in other embodiments these features may not exactly correspond. The dog-eared edge 35 may provide clearance for the presence and movement of the end skirt 120, 122 described elsewhere in this disclosure.

The feeder apparatus 10 may also include a feed shelf 36 which is located below the feed hopper 20, and more specifically the feed discharge opening 26 of the hopper. The feed shelf 36 may be elongated in the longitudinal direction of the apparatus and have opposite ends 38, 39 located proximate to the respective ends 12, 13 of the apparatus 10. The feed shelf 36 may be movable with respect to the feed hopper in a substantially lateral direction of the apparatus such that the shelf moves toward and away from the opposite sides 14, 15 of the apparatus. Advantageously, the feed shelf 36 may also be movable with respect to the feed hopper in a substantially longitudinal direction of the apparatus such that the shelf moves toward and away from the opposite ends 12, 13 of the apparatus. The feed shelf 36 is thus capable of movement in both lateral and longitudinal directions of the apparatus 10.

The feed shelf may have an upper feed support surface 40, and at least a portion of the upper feed support surface may be located directly below the feed discharge opening 26 of the feed hopper. The spacing of the upper feed support surface 40 and the feed discharge opening 26 of the feed hopper may be adjustable to adjust a rate at which feed is dispensed through the feed discharge opening 26 from the feed hopper 20 to the upper feed support surface of the feed shelf. Suitable mechanisms for accomplishing adjustment of the spacing are known in the art.

The feed shelf 36 may have a central portion 44 which forms at least a portion of the upper feed support surface 40 and may extend longitudinally between the ends 38, 39 of the feed shelf. The central portion may have lateral sides 46, 47 located on either lateral side of the central portion. The upper feed support surface 40 on the central portion may be substantially planar between the lateral sides 46, 47, while lateral side sections 48, 49 of the central portion located along the lateral sides of the central portion may form a raised lip.

At least one passage slot 50 may be formed in the central portion 44 of the feed shelf, and in some embodiments a plurality of at least two of the slots 50 may be located in the central portion. The passage slot 50 may generally extend in the longitudinal direction of the apparatus 10, and plural slots 50 may be arranged in a longitudinal array. Illustratively, the passage slot 50 may have a center section 52 and a pair of end sections 54, 55 which extend in substantially opposite directions from the center section 52 such that the center section is positioned between the end sections. The width of the center section 52 may be relatively wider in the lateral direction of the apparatus than the width of the end sections (also in the lateral direction) so that the center section is wider than the end sections.

The feed shelf 36 may also include a pair of flange portions 56, 57 which extend downwardly from the central portion 44. Each of the flange portions may be located toward one of the lateral sides 46, 47 of the central portion, and may extend generally perpendicular to the plane of the upper feed support surface 40. Advantageously, the presence of the flange portions on the shelf 36 may discourage the feeding animal from attempting to bite onto the side of the feed shelf 36. The feed shelf may also include a pair of skirt portions 58, 59 which also extend generally downwardly from the central portion 44. The skirt portions 58, 59 may be positioned between the flange portions 56, 57, and the skirt portions may be laterally spaced from each other. The skirt portions may provide increased longitudinal rigidity to the tray and reduce flexing when feed accumulates on the feeding tray assembly. Optionally, only one skirt portion may be utilized on the feed shelf (see, e.g., FIGS. 16 and 17).

In some embodiments, the feed shelf 36 may also include a pair of end skirt portions 120, 122 positioned at the opposite ends 38, 39 of the feed shelf. Each of the end skirt portions 120, 122 may extend upwardly vertically beyond the upper feed support surface 40 of the feed shelf to protrude above the surface 40 and thereby resist movement of the feed particles resting on the surface 40 off of the surface. Each end skirt portion may also extend downwardly with respect to the upper feed support surface 40 adjacent to the flange portions 56, 57. Although such downward extension of the end skirt portions is not utilized in all embodiments, the downwardly extending end skirt portions may effectively form a perimeter wall for the feed shelf with the flange portions 56, 57 that may beneficially enhance the rigidity of the shelf 36 against, for example, twisting or warping.

The apparatus 10 may also include a feed shelf adjustment assembly 124 that is configured to adjust a position of the feed shelf in a vertical direction, and may adjust a proximity of the upper feed support surface 40 on the feed shelf to the feed discharge opening 26 of the feed hopper to facilitate adjustment of the rate at which feed is dispensed from the feed hopper to the feed shelf. The feed shelf adjustment assembly 124 may be positioned in the interior 22 of the hopper, although portions may also be situated outside of the hopper interior. A pair of the feed adjustment assemblies may be utilized with each assembly being located at an end of the feeder apparatus 10 and positioned adjacent to one of the end walls 32, 33 of the feed hopper to adjust one of the ends of the feed shelf.

Each of the feed shelf adjustment assemblies 124 may include a feed shelf support arm 126 that extends upwardly from the feed shelf 36 and may be positioned adjacent to one of the end walls 32, 33 of the hopper to engage the feed shelf toward a respective end of the shelf. In some embodiments, the feed shelf support arm 126 may extend through an aperture 128 that is formed in the feed shelf and that may be located in the central portion 44 of the feed shelf toward the end 38, 39 of the feed shelf. Optionally, an arm mounting plate (not shown) may be suitably attached to (e.g., welded on) the bottom of the feed shelf to facilitate connection of a portion of the feed shelf support arm 126 to the central portion of the feed shelf. The adjustment assemblies may also include a feed shelf adjustment device 130 having the feed shelf support arm depending or extending downwardly therefrom, and each feed shelf adjustment device may be mounted on one of the end walls of the hopper. Suitable adjustment devices are known in the art.

The apparatus 10 may also include a feed trough 60 which is located toward the bottom 17 of the apparatus and is located below the feed hopper 20, as well as the feed shelf 36. The feed trough may have an upper surface which forms a lower feed support surface 62 upon which feed rests for being eaten by the feeding animal, and may be oriented substantially horizontally to facilitate the positioning of the feed on the surface 62. The feed trough 60 may have a main portion 64 and first 66 and second 67 side portions that are positioned on opposite sides of the main portion and that extend upwardly and outwardly from the main portion. The feed trough 60 may be elongated in the longitudinal direction of the apparatus 10 between the ends 12, 13 of the apparatus. Illustratively, the feed trough may be positioned approximately 8 to approximately 10 inches below the feed hopper.

Optionally, a fluid supply pipe 68 may be provided on the apparatus 10 for providing drinking water to the feeding animal. The supply pipe 68 may have a first portion 70 which is positioned above the lower feed support surface 62 of the feed trough, and may also be positioned below the feed discharge opening 26 of the hopper in an orientation substantially parallel to the opening 26 but also vertically spaced above the lower feed support surface 62. The fluid supply pipe 68 may also have a second portion 71 which extends generally upwardly from the first portion 70 and may be positioned adjacent to one of the end walls 32, 33 of the feed hopper.

The apparatus 10 may also include a feed shelf movement assembly 74 which is configured to permit a feeding animal to move the feed shelf 36 to dispense further feed from the hopper. The feed shelf movement assembly 74 may be configured to permit movement of the feed shelf without requiring the feeding animal to directly contact the feed shelf 36 to cause such movement, and may be actuatable by the feeding animal while the animal is consuming feed from the lower feed support surface 62 of the trough 60. The feed shelf movement assembly 74 may be particularly configured to cause movement of the feed shelf in the longitudinal direction of the apparatus while permitting, and optionally causing, movement of the feed shelf in the lateral direction, and thereby may provide two directions of movement for the shelf.

The feed shelf movement assembly 74 may include at least one actuator 76 which is movable with respect to the elements of the apparatus 10, including the feed hopper and the feed trough. The actuator 76 may be movable in the longitudinal direction of the apparatus 10, and may also be movable in the lateral direction of the apparatus, to cause corresponding movement of the feed shelf 36 in the longitudinal and lateral directions. The actuator 76 may be mounted on the feed hopper 20, and may be mounted to the neck portion 30 of at least one of the hopper walls, and in some embodiments both of the hopper walls. The extension of the actuator 76 into the neck of the hopper may function to encourage feed flow out of the hopper interior when the actuator is moved and may also serve to break up agglomerations of feed in the lowermost portions of the interior at the neck where clogging may occur. The actuator 76 may be pivotable with respect to the hopper and the hopper walls. In some embodiments, a plurality of the actuators 76 may be utilized on the apparatus and each may be pivotally mounted on the feed hopper. The pivot movement of the actuator or actuators may be in a substantially vertical plane which extends in the longitudinal direction of the apparatus 10.

The actuator 76 may extend through the passage slot 50 in the feed shelf, and may be positioned in the center section 52 of the slot 50. The actuator 76 may have a width that permits positioning of the actuator in the center section but does not permit movement of the actuator into the end sections 54, 55 of the slot 50. The actuator 76 may have an upper end 78 and a lower end 79, and the upper end 78 may be positioned above the feed shelf 36 and the lower end 79 may be positioned below the feed shelf. The lower end 79 of the actuator may be positioned above and adjacent to the lower feed support surface 62 of the feed trough in a manner permitting access to the actuator by the nose or snout of the animal feeding from the surface 62. The actuator 76 may have an upper end portion 80 which may be located adjacent to the upper end 78 of the actuator and may be located above the feed shelf. The actuator 76 may also include a lower end portion 81 which is located adjacent to the lower end 79 and may be located below the feed shelf. The lower end portion 81 may be bifurcated such that a section 82 of the lower end portion extends on each lateral side of the fluid supply pipe 68.

The upper end 78 may be pivotally mounted on the hopper 20 by a pivot shaft 83 extending between the hopper walls 28, 29, and in particular between the neck portions 30 of the walls 28, 29. In some embodiments, the actuator 76 may include a sleeve which receives and pivots on the pivot shaft 83 (see, e.g., FIGS. 15, 16 and 18). In other embodiments, the pivot shaft 83 may pass through a hole 85 formed in the upper end 78 of the actuator (see, e.g., FIGS. 18 and 19) which may permit pivot movement of the actuator on the pivot shaft 83 in the longitudinal direction of the apparatus 10, but may also permit a degree of lateral movement of the actuator in the lateral direction of the apparatus 10. Greater tolerances between the size of the pivot shaft and the size of the holes in the actuator may permit a greater degree of lateral movement.

The feed shelf movement assembly 74 may also include an actuator engagement element 84 mounted on the feed shelf 36. The actuator engagement element 84 may be contacted by the actuator 74 during movement of the actuator such that movement of the actuator in at least the longitudinal direction may be limited by the element 84. The engagement element 84 may be positioned below the feed shelf and may extend downwardly with respect to the feed shelf. In some embodiments, the actuator engagement element may include a pair of engagement fingers 86, 87 which may define a gap 88 between the fingers with a section of the actuator 76 being positioned in the gap. The section of the actuator positioned in the gap may be a section of the lower end portion 81 of the actuator. The width of the gap 88 in the longitudinal direction of the apparatus 10 may be greater than the width of the section of the lower end portion of the actuator positioned within the gap so that the degree of movement by the actuator may be limited by the engagement fingers on the feed shelf. In some embodiments, the function of the engagement element may be performed by a portion of the skirt portion 58 of the feed shelf. Illustratively, a skirt portion extension 89 (see, e.g., FIGS. 19 and 22) may extend laterally, and may be substantially horizontally oriented, to form the gap 88 which receives a portion of the actuator so that pivot movement of the actuator 76 contacts the actuator with the edges of the skirt portion extension 89. An actuator retainer 91 may extend across the gap 88 to retain the portion of the actuator extending through the gap in the gap.

The feed shelf movement assembly 74 may also include an actuator extension 90 which is mounted on the actuator so as to move with the actuator. The actuator extension 90 may be configured to provide a relatively larger surface adjacent to the lower feed support surface of the feed trough for the feeding animal to engage the actuator. The actuator extension 90 may be mounted on the lower end portion 81 of the actuator, and may extend laterally outwardly from the actuator toward at least one of the opposite sides of the apparatus. In some embodiments, the actuator extension 90 may rest upon the lower feed support surface 62 of the feed trough.

The apparatus 10 may also include a feed sweeper assembly 94 which is configured to move feed positioned on the upper feed support surface 40 of the feed shelf to encourage movement of the feed from the feed hopper and also break up accumulations or agglomerations of feed located adjacent to the upper feed support surface. The feed sweeper assembly 94 may be moved by elements of the feed shelf movement assembly 74, and may move as a result of an animal actuating the actuator 76 of the movement assembly 74.

The feed sweeper assembly 94 may include a sweeper plate 96 which rests upon the feed shelf 36, may be slidable on the upper feed support surface 40 of the shelf. In some embodiments, the sweeper plate 96 may include a pair of sweeper plate portions 98, 99 which may be attached together (see, e.g., FIGS. 4 through 7 and 9), while in other embodiments the sweeper plate is formed from a single part or piece of material (see, e.g., FIGS. 17 through 19). A portion of the actuator 76 of the feed shelf movement assembly may extend through a sweeper slot 100 formed in the sweeper plate 96. The sweeper slot may be configured such that movement of the actuator 76 is transferred to the sweeper plate 96. A portion of the actuator 76 may be positioned between the pair of sweeper plate portions 98, 99 for bifurcated sweeper plates. In some embodiments, the sweeper plate may have a lateral outer edge 102 which extends generally in the longitudinal direction of the apparatus, and the outer edge 102 may have a zigzag configuration which may approximate the shape of a sine wave to facilitate the engagement and dislodgement of feed on the upper feed support surface. In embodiments employing the pair of sweeper plate portions, each of the plate portions may have one of the lateral outer edges.

Each of the sweeper plate portions 98, 99 may include a base section 104 which is positioned adjacent to the upper feed support surface of the feed shelf, and at least one connector section 106 which extends generally upwardly from the base section 104. The connector section 106 of one of the sweeper plate portions may be positioned adjacent to the connector section of the other one of the sweeper plate portions so that the connector sections are fastenable together. Connecting or fastening together of the connector sections may trap the section of the actuator 76 between the plate portions 98, 99 in the sweeper slot 100, and as a result the sweeper plate 96 is moved by movement of the actuator 76. In some embodiments, the sweeper slot 100 is configured such that the section of the actuator 76 fits relatively snugly within the sweeper slot in virtually all movement of the actuator in the longitudinal direction is communicated to the sweeper plate.

Figure 9:
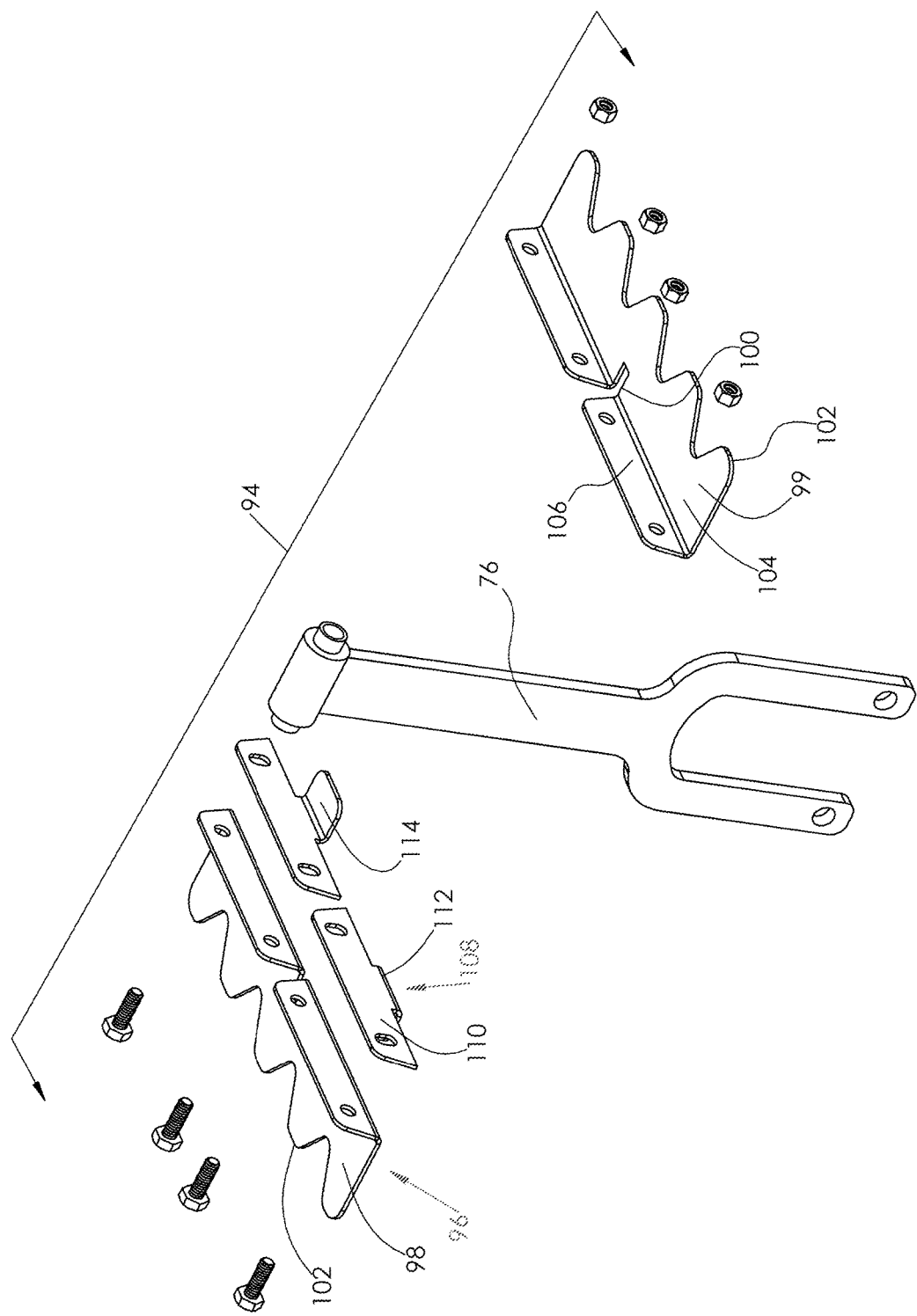
FIG. 9 is a schematic exploded perspective view of elements of the feed sweeper assembly, according to an illustrative embodiment.
Figure 10:
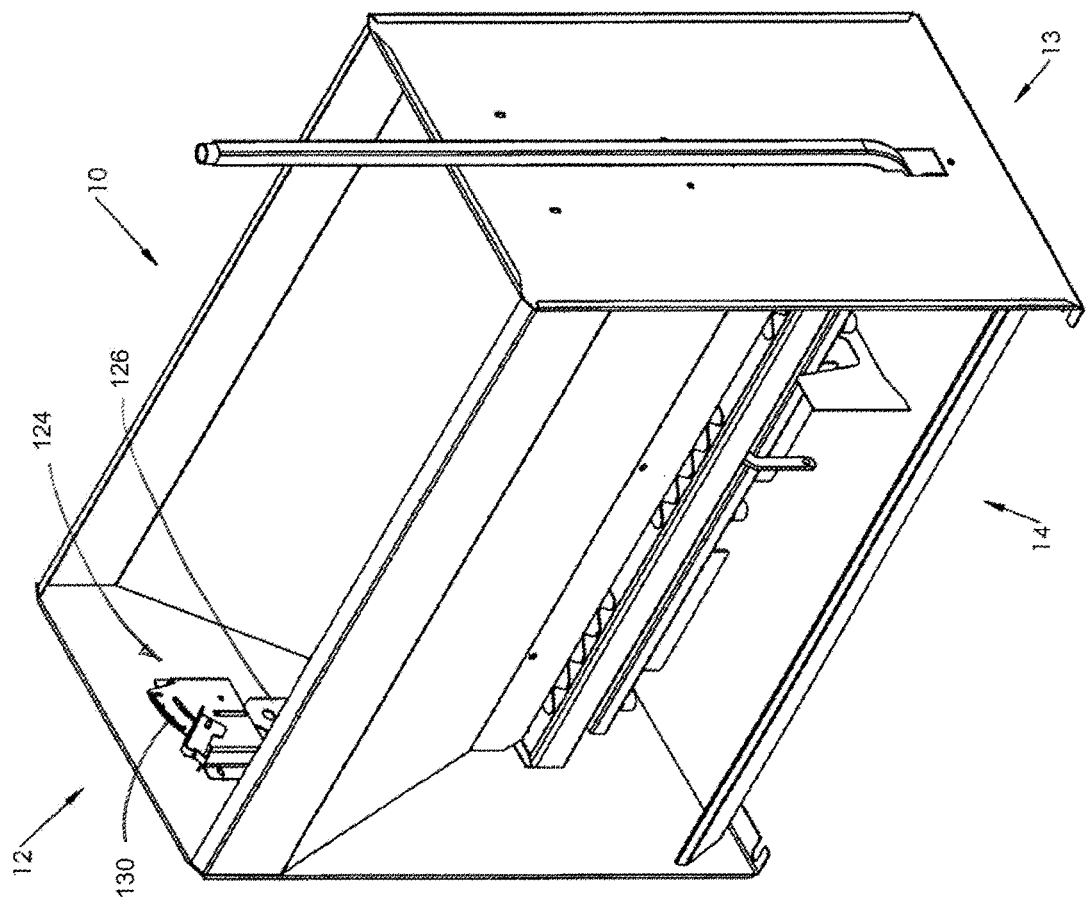
FIG. 10 is a schematic perspective view of an embodiment of an animal feeder apparatus according to the present disclosure with optional features.
Figure 11:
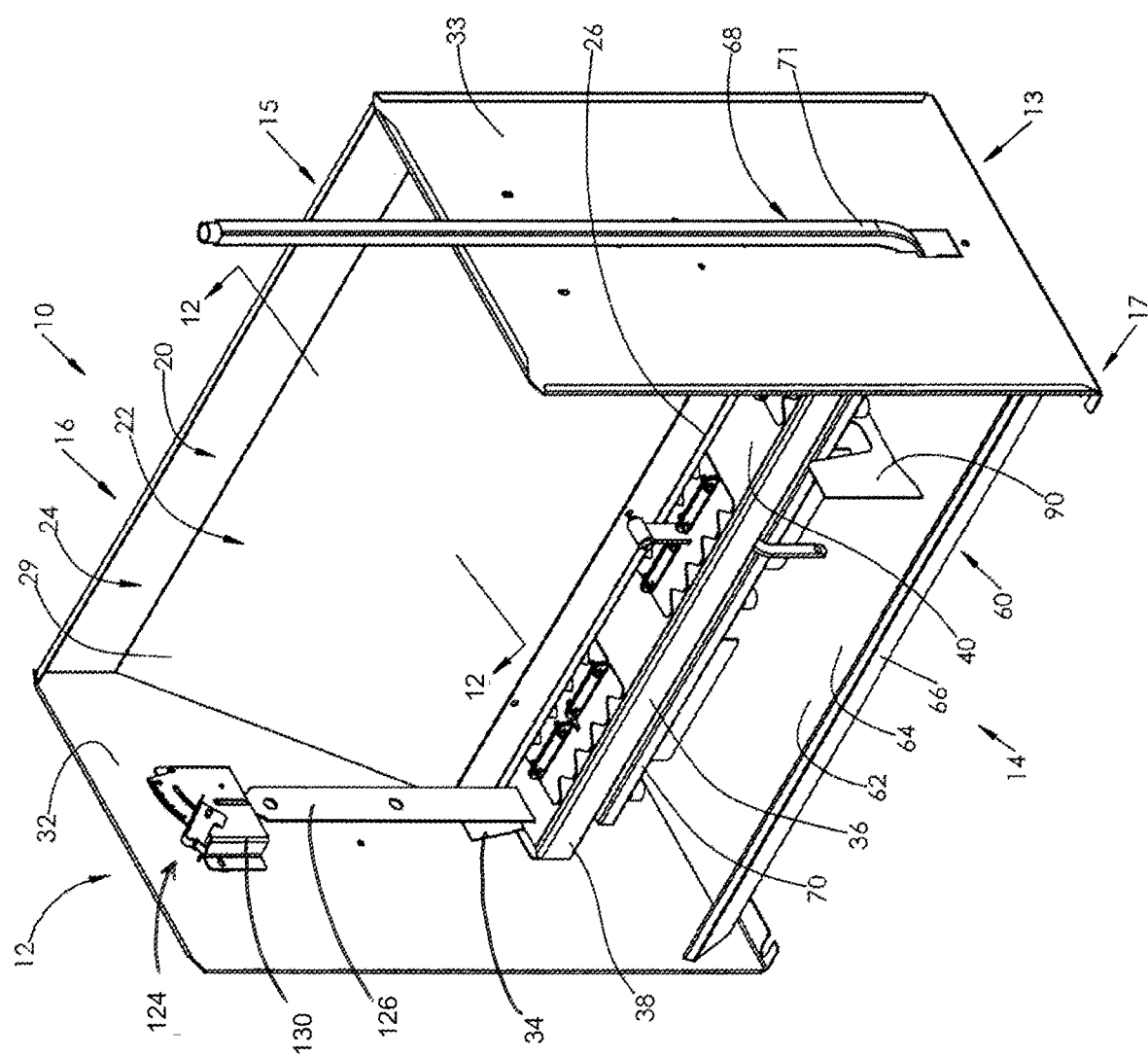
FIG. 11 is a schematic perspective view of the apparatus of FIG. 10 with portions, including one of the hopper walls, removed to reveal detail of the apparatus, according to an illustrative embodiment.
Figure 12:
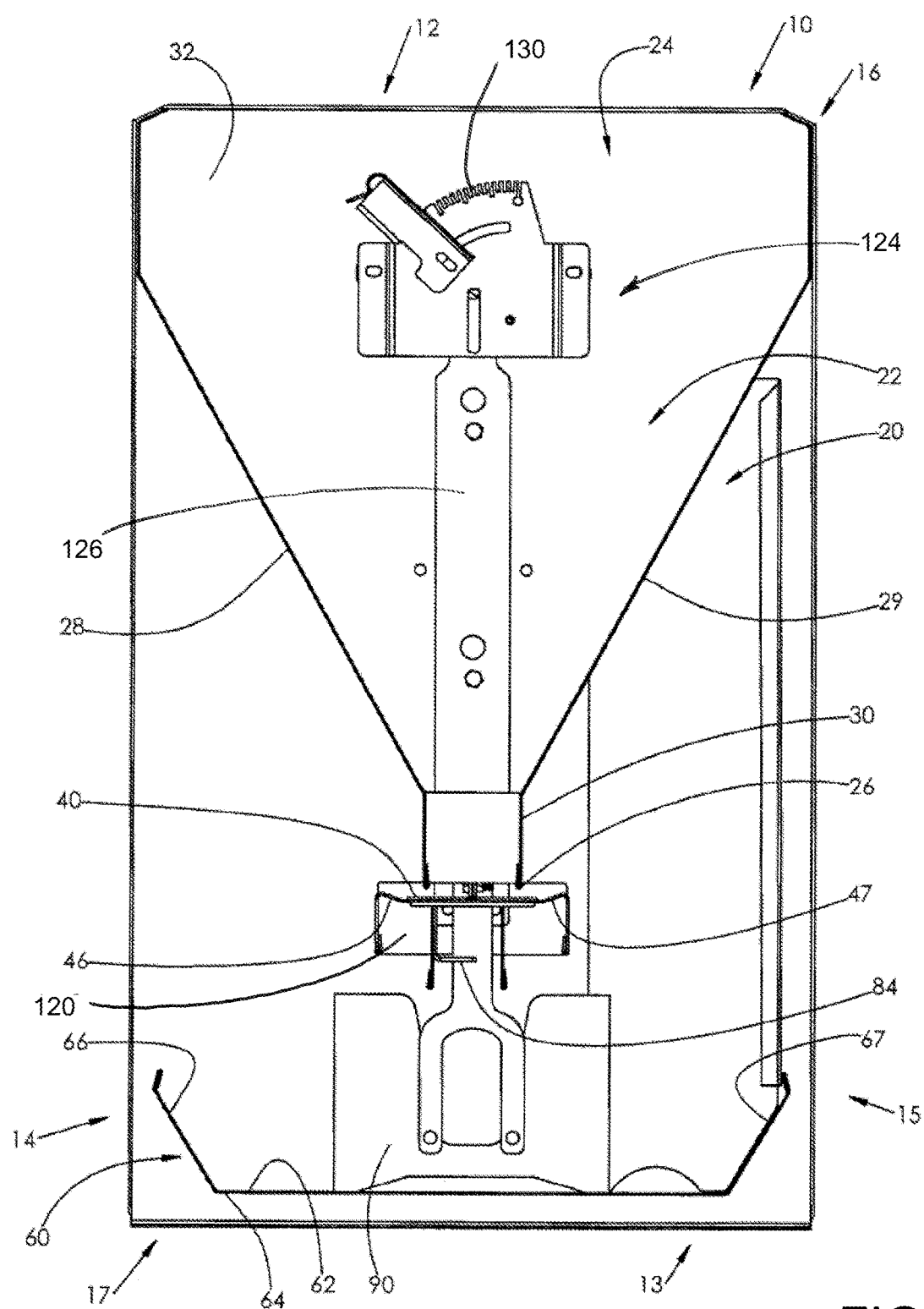
FIG. 12 is a schematic sectional view of the apparatus of FIG. 10 taken along line 12-12 of FIG. 11, according to an illustrative embodiment.
Figure 13:
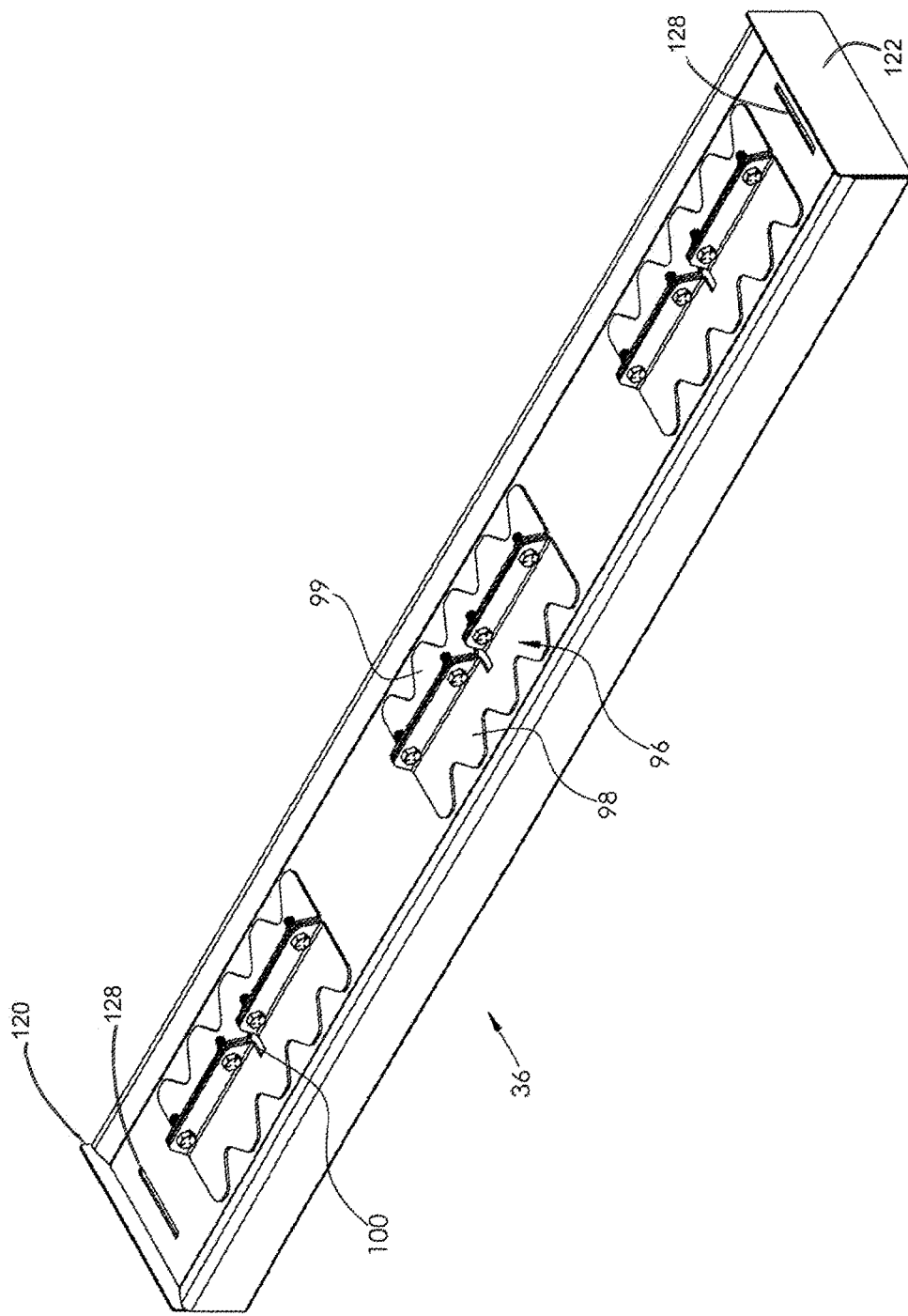
FIG. 13 is a schematic perspective view of elements of the apparatus of FIG. 10 including the feed shelf and the feed sweeper assembly, according to an illustrative embodiment.
Figure 14:
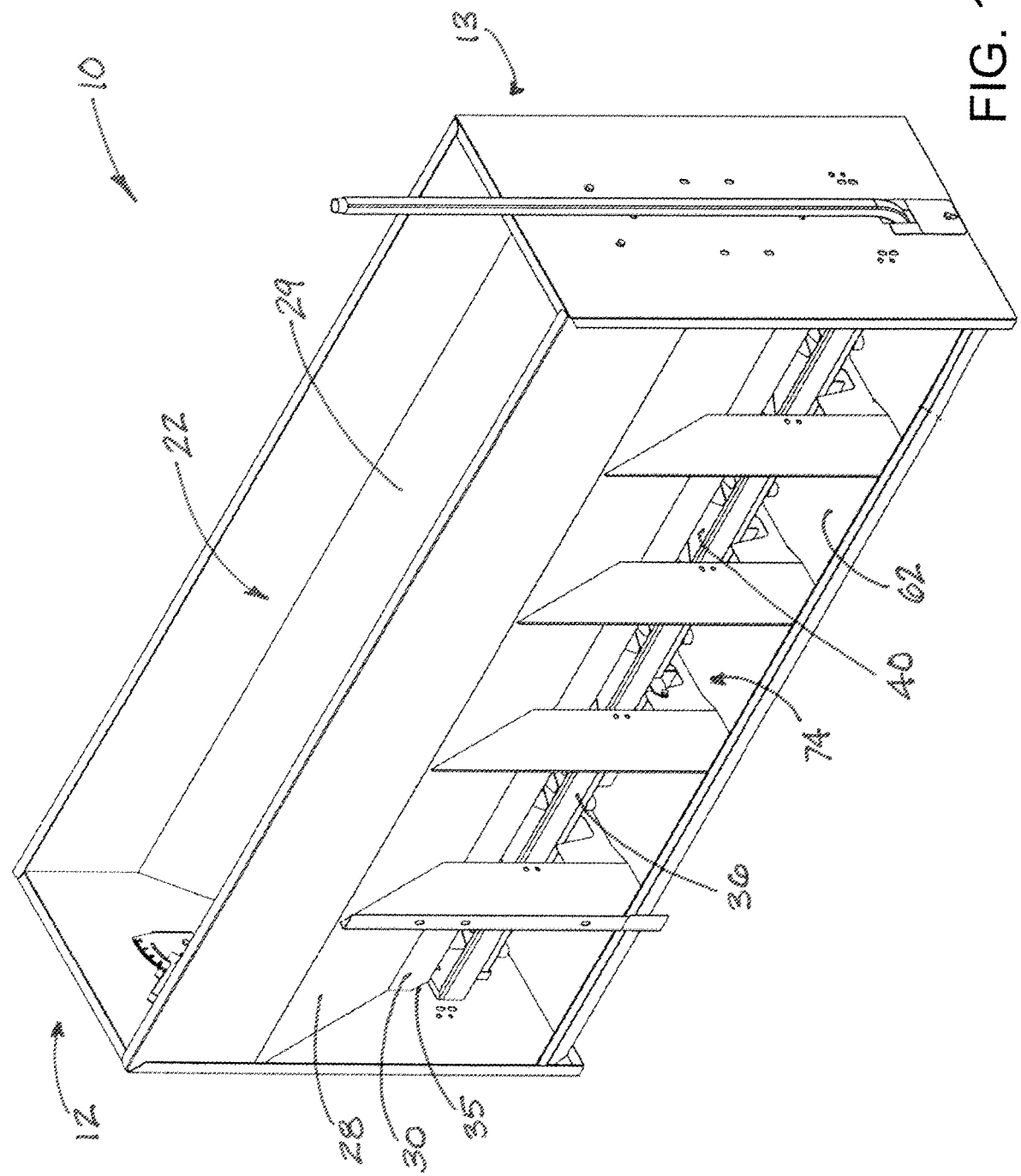
FIG. 14 is a schematic perspective view of an embodiment of an animal feeder apparatus according to the present disclosure with optional features.
Figure 15:
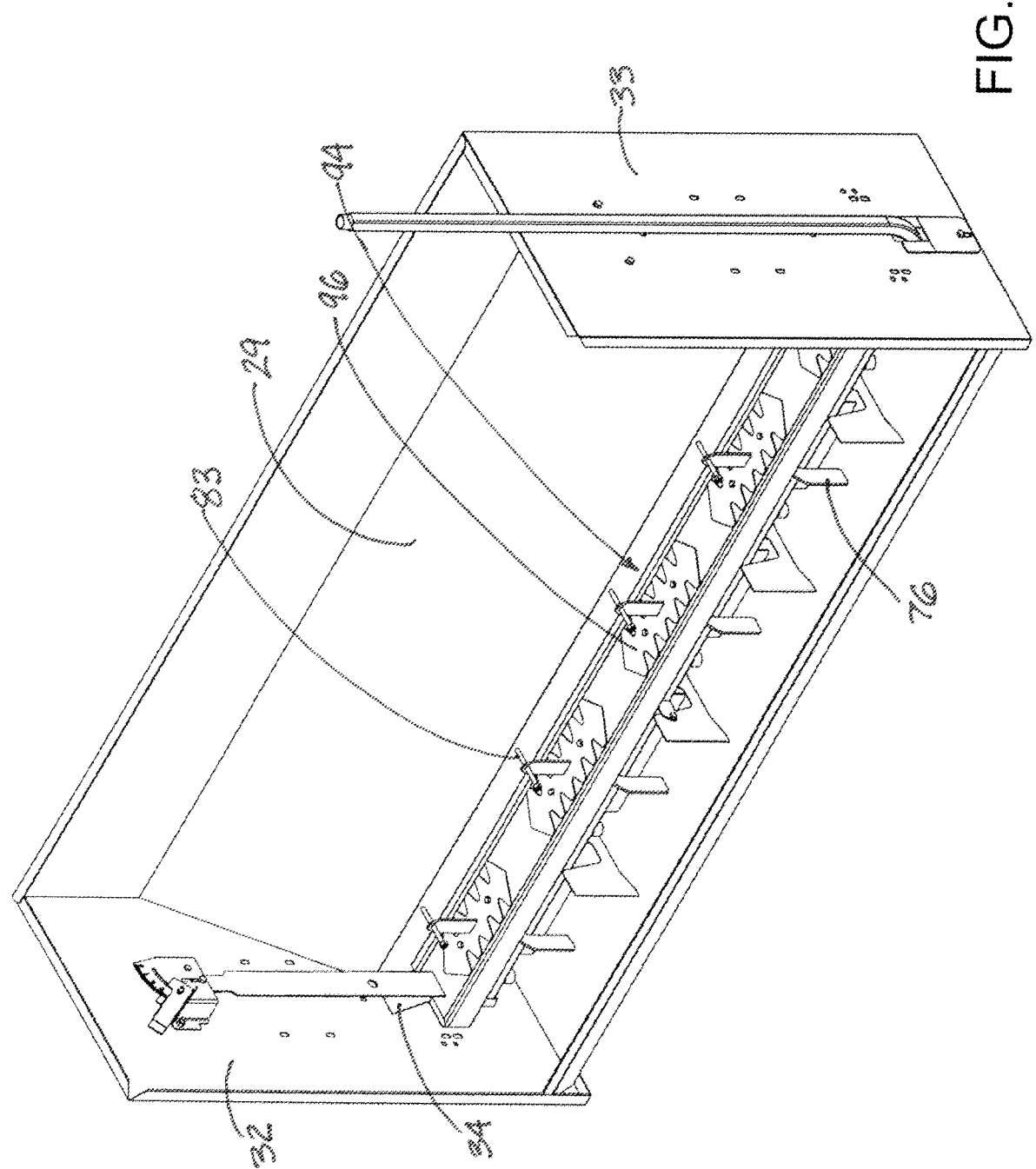
FIG. 15 is a schematic perspective view of the apparatus of FIG. 10 with portions, including one of the hopper walls, removed to reveal detail of the apparatus, according to an illustrative embodiment.
Figure 16:
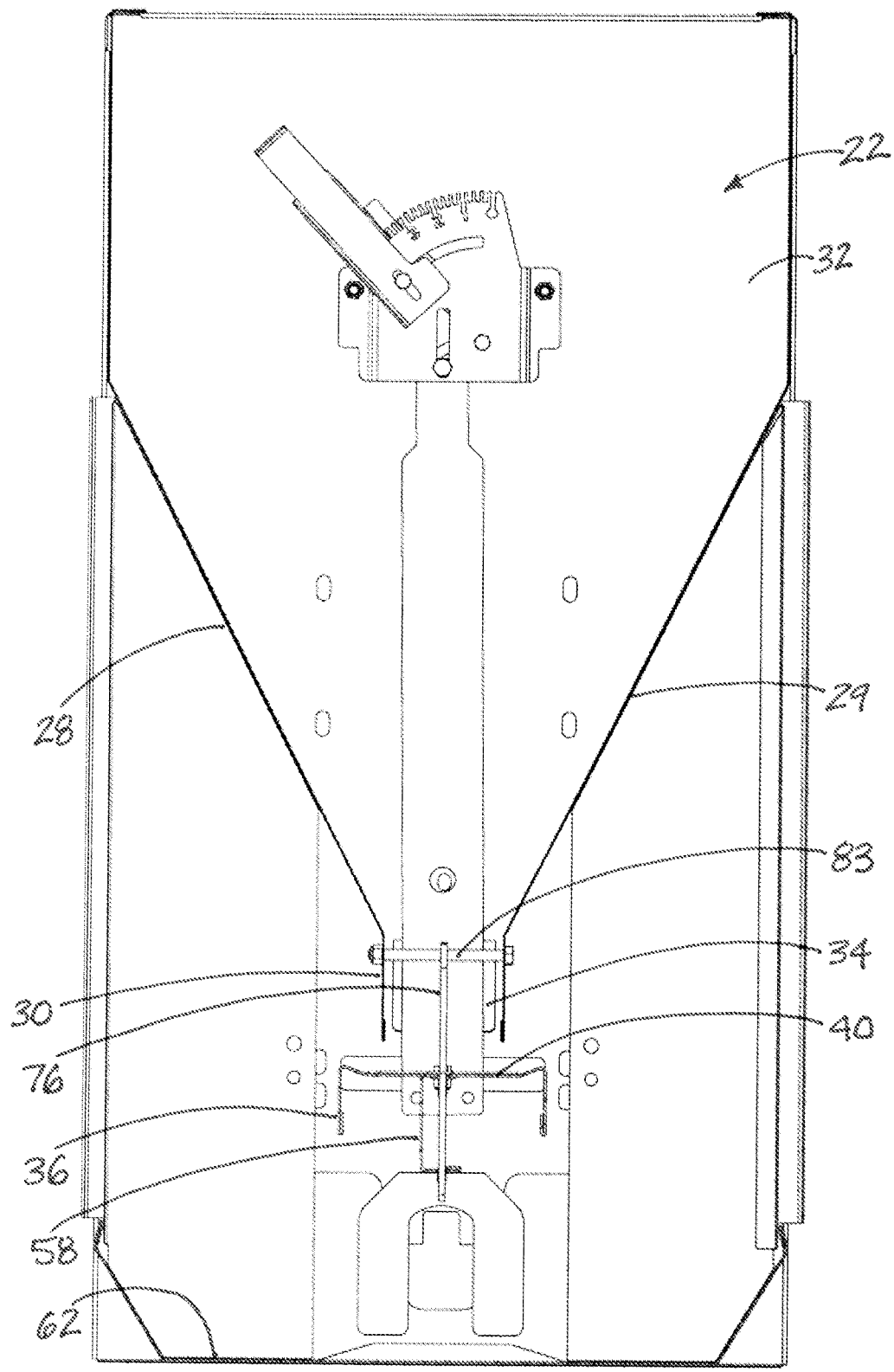
FIG. 16 is a schematic sectional view of the apparatus of FIG. 14, according to an illustrative embodiment.
Figure 17:
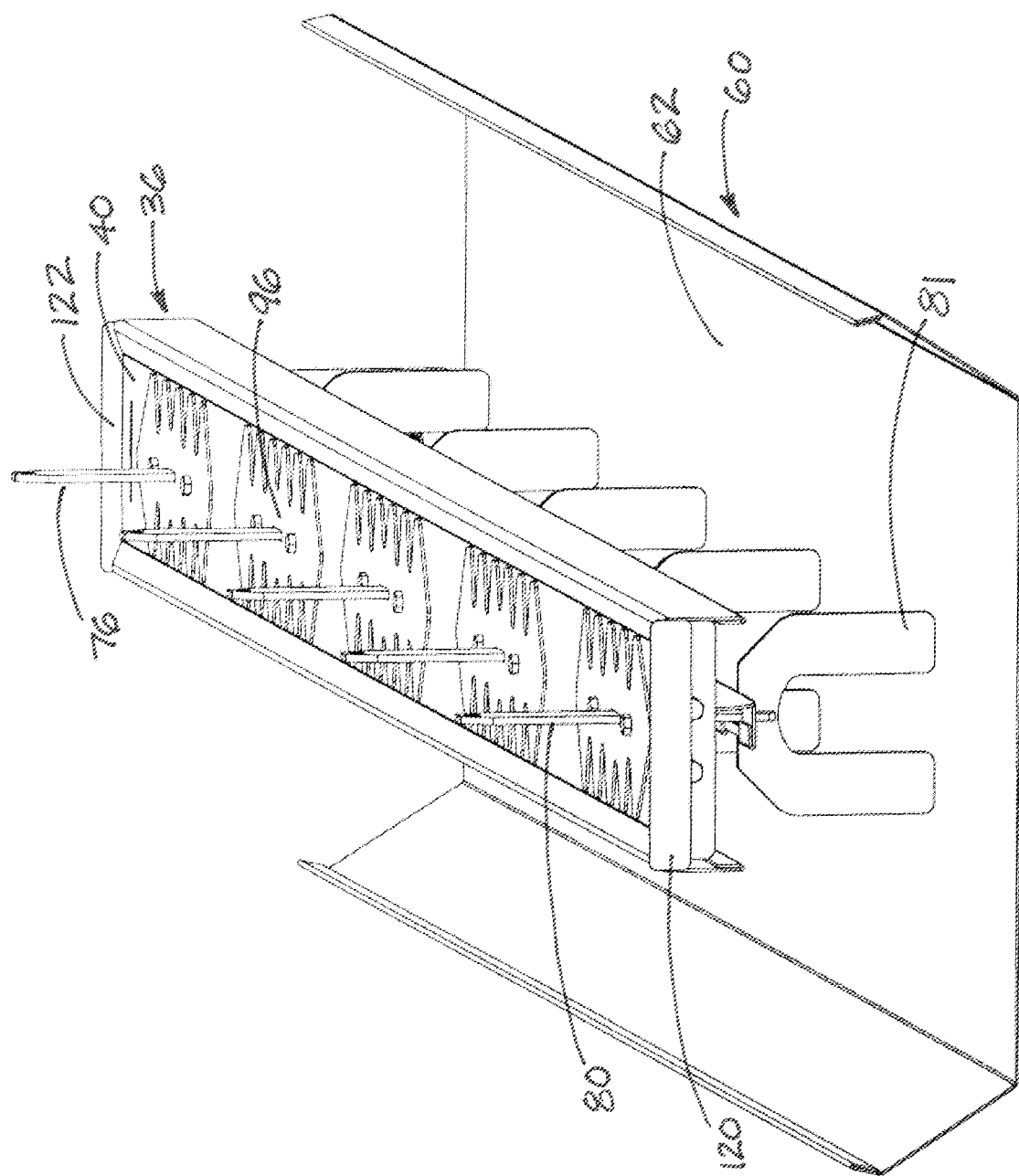
FIG. 17 is a schematic perspective view of elements of the apparatus of FIG. 14 including the feed shelf and a plurality of the feed sweeper assemblies, according to an illustrative embodiment.
Figure 18:
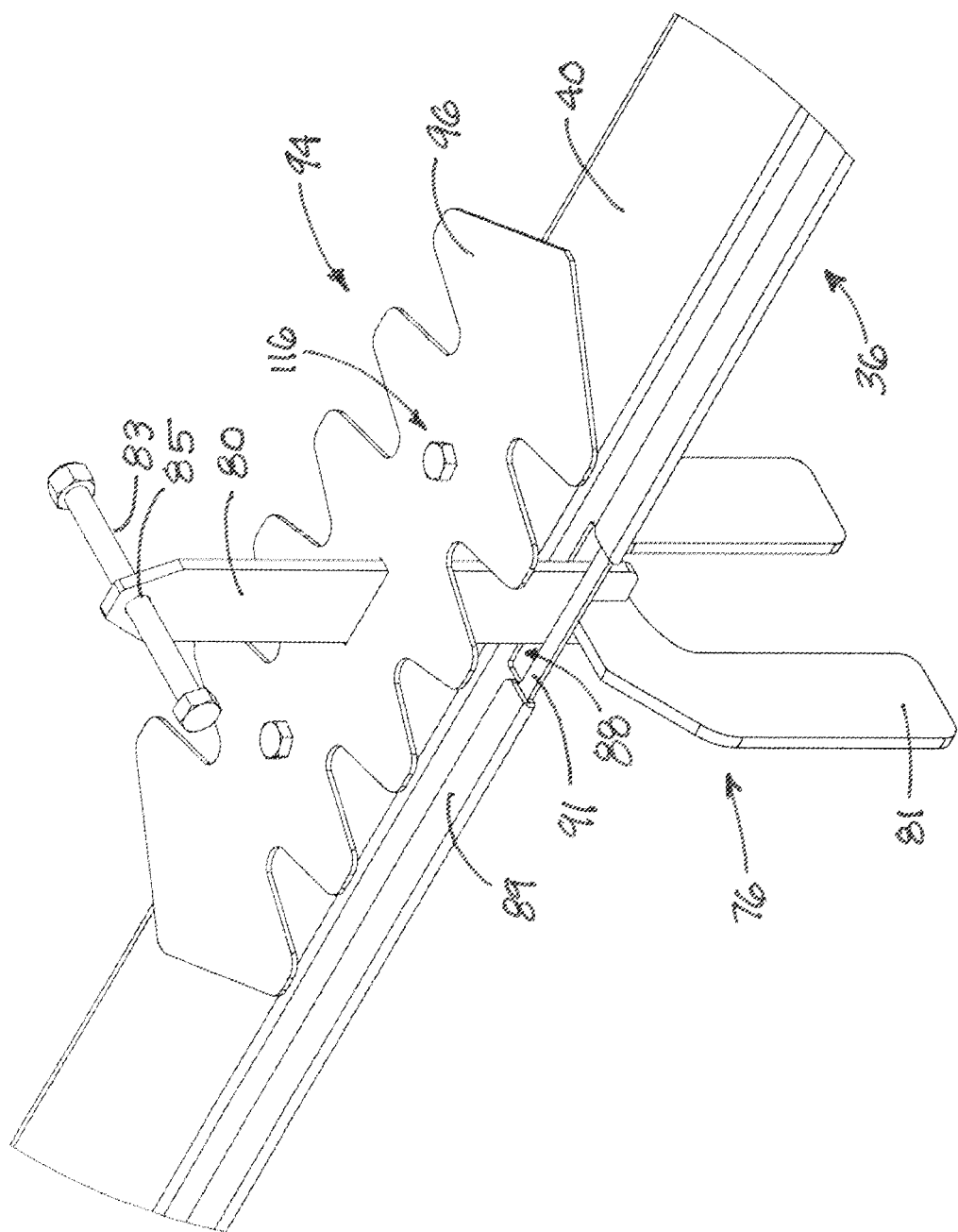
FIG. 18 is a schematic perspective view of elements of the apparatus of FIG. 14 including the feed shelf and one of the feed sweeper assemblies, according to an illustrative embodiment.

The feed sweeper assembly 94 may also include means for maintaining the sweeper plate 96 on or adjacent to the upper feed support surface 40 on the feed shelf and resist, for example, movement of the sweeper plate upwardly away from the feed shelf. In some embodiments, such as is shown in FIG. 9, the feed sweeper assembly 94 may include a sweeper plate keeper 108 which is configured to maintain a sweeper plate 96 in an adjacent relationship to the upper feed support surface. The sweeper plate keeper 108 may be mounted to the sweeper plate, and a first portion 110 of the sweeper plate keeper may be positioned between the sweeper plate portions 98, 99 and more specifically may be positioned between the connector sections 106 of the sweeper plate portions. In some embodiments, fasteners which fasten the connector sections 106 of the plate portions 98, 99 together may also pass through the first portion 110 of the plate keeper as well. A second portion 112 of the sweeper plate keeper 108 may extend through the passage slot 50, such as through one of the end sections 54, 55 of the slot 50. A third portion 114 of the sweeper plate keeper 108 may extend from the second portion 112 in a direction that is substantially parallel to a plane of the central portion 44 of the feed shelf 36 at a position below the central portion. A pair of the sweeper plate keepers 108 may be employed to maintain the sweeper plate in the adjacent relationship to the upper feed support surface, and each of the sweeper plate keepers may be positioned between the sweeper plate portions of the sweeper plate. The third portions of the respective sweeper plate keepers may extend in substantially opposite directions with respect to each other to provide an enhanced level of resistance to lifting of the sweeper plate from the upper feed support surface.

Figure 19:
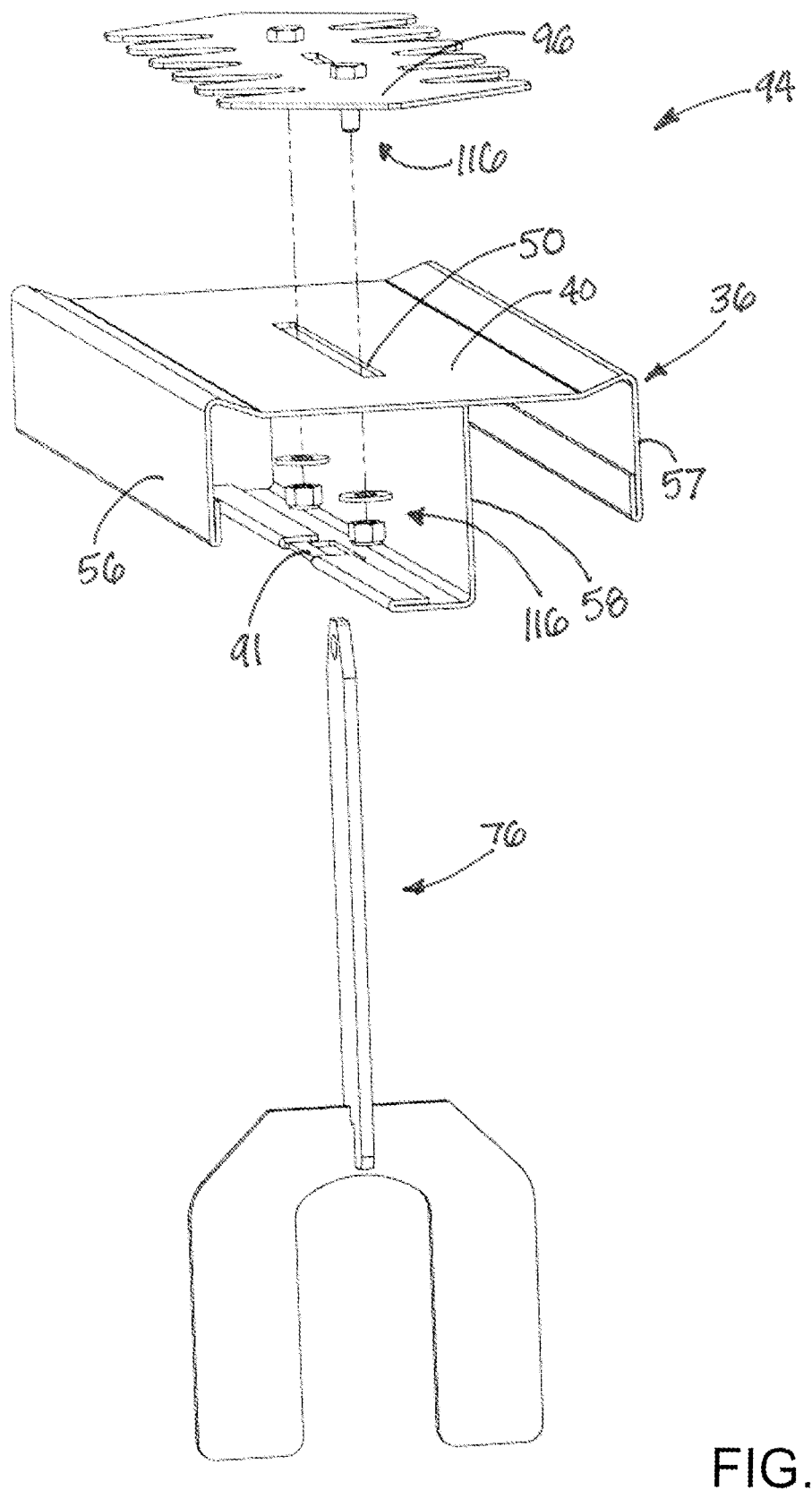
FIG. 19 is a schematic exploded perspective view of elements of the apparatus of FIG. 14 including the feed shelf and one of the feed sweeper assemblies, according to an illustrative embodiment.
Figure 20:
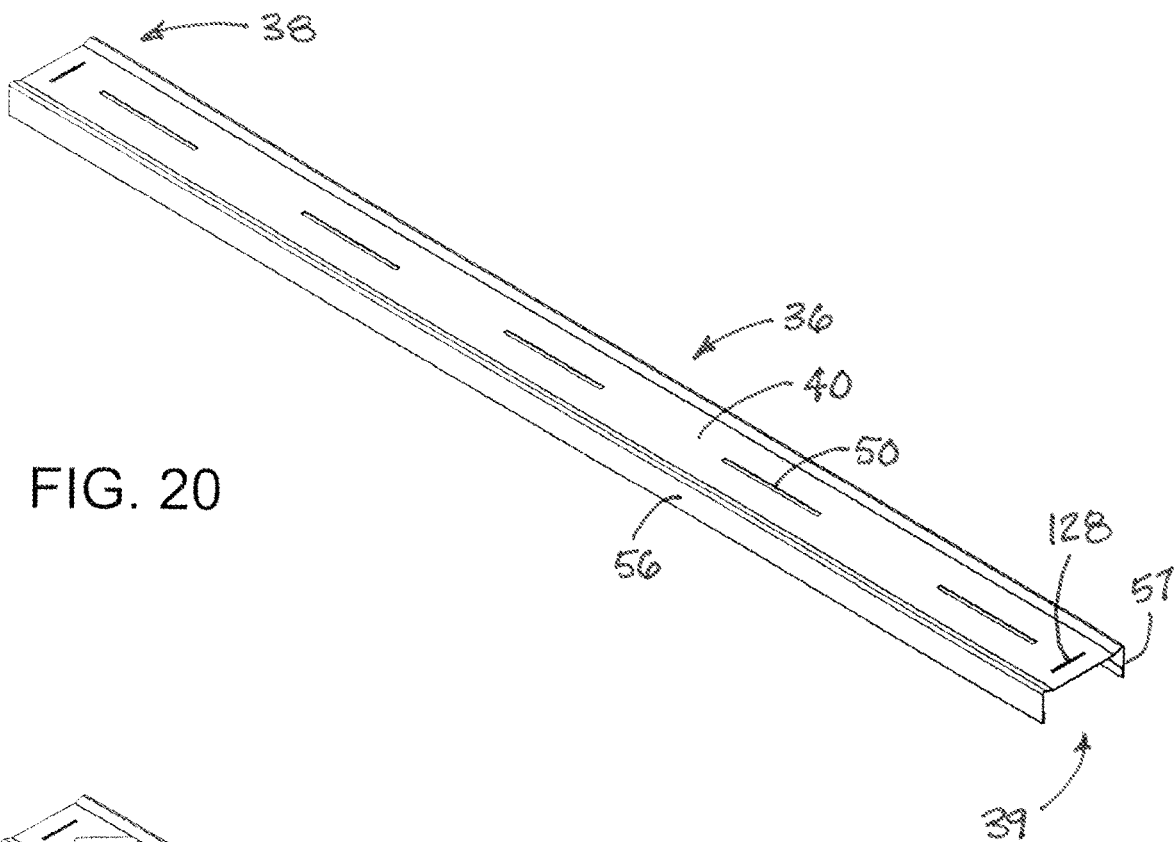
FIG. 20 is a schematic perspective view of a feed shelf of the apparatus of FIG. 14, according to an illustrative embodiment.
Figure 21:
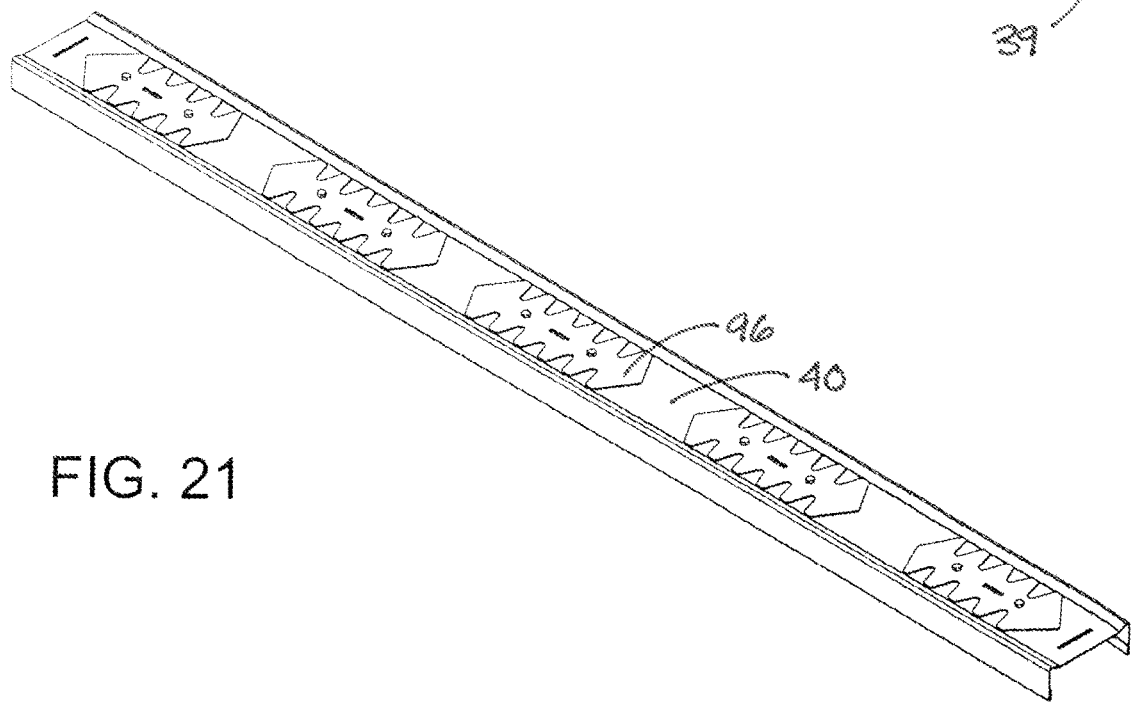
FIG. 21 is a schematic perspective view of elements of the apparatus of FIG. 14 including a feed shelf and a sweeper plate of a feed sweeper assembly, according to an illustrative embodiment.
Figure 22:
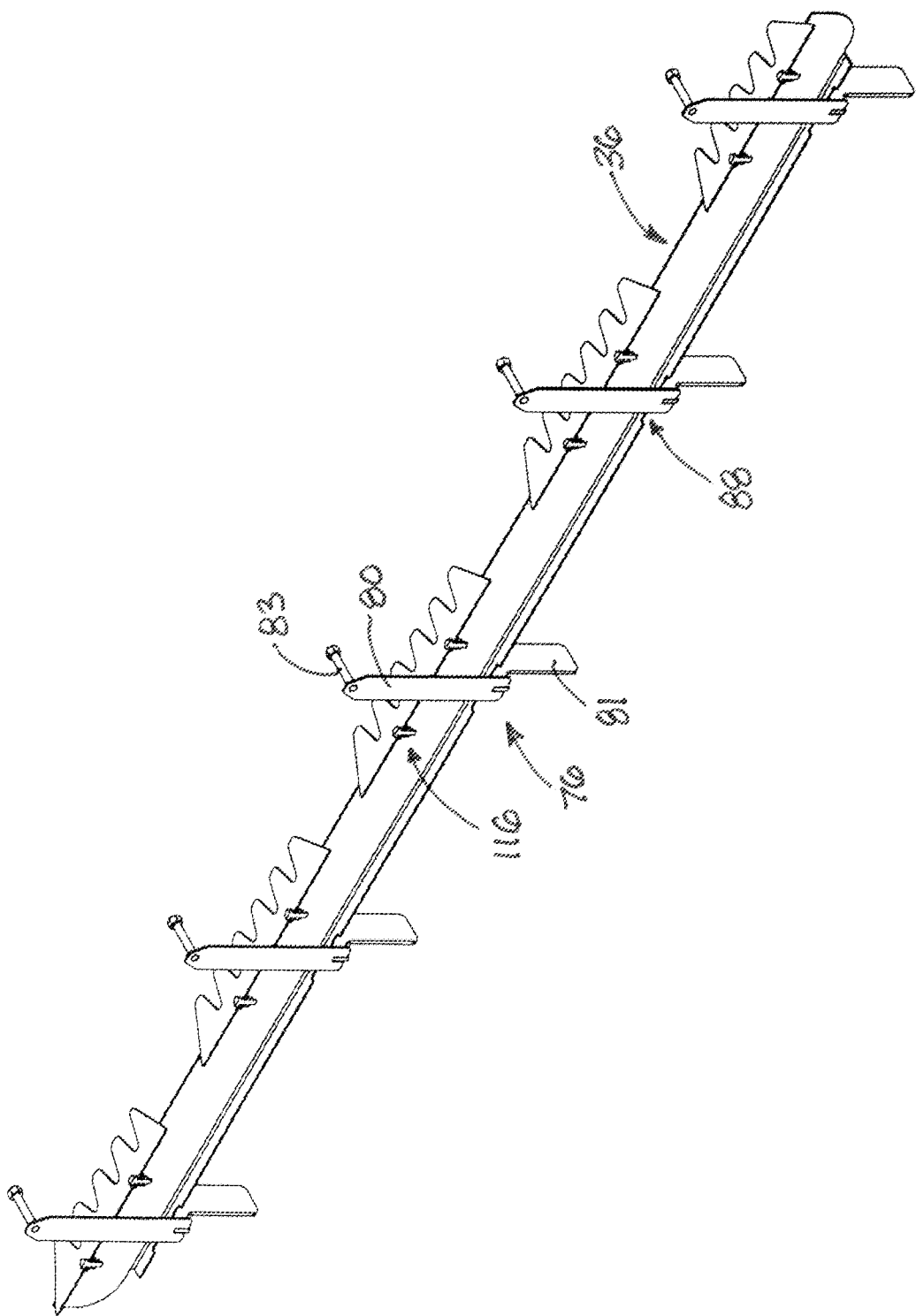
FIG. 22 is a schematic perspective sectional view of elements of the apparatus of FIG. 14 including the feed shelf and a plurality of the feed sweeper assemblies, according to an illustrative embodiment.
Figure 23:
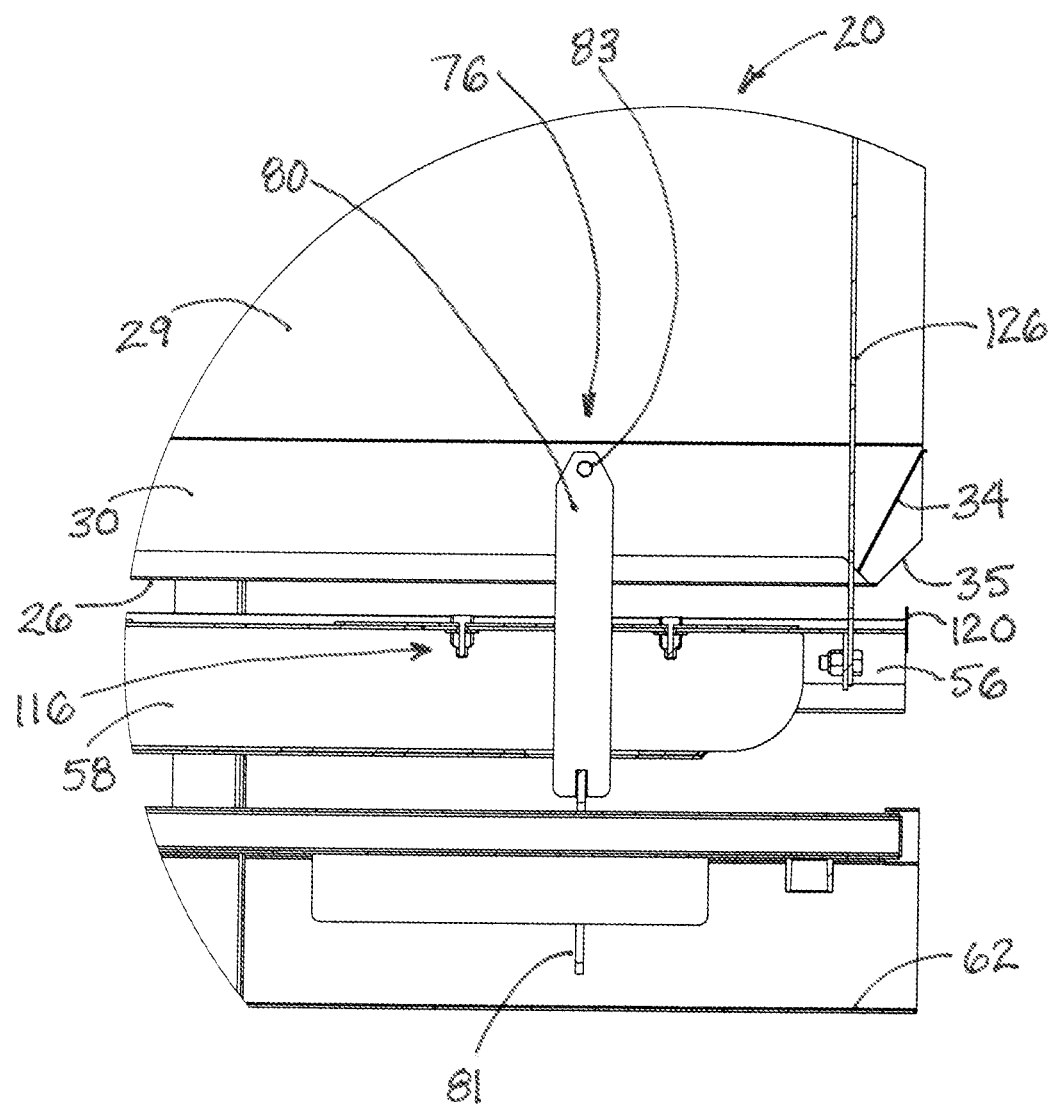
FIG. 23 is a schematic side sectional view of a portion of the apparatus of FIG. 14 showing portions of the hopper, the feed shelf and one of the feed sweeper assemblies, according to an illustrative embodiment.

In other embodiments, such as shown in FIGS. 19 and 22, means for maintaining the sweeper plate on or adjacent to the upper feed support surface may include one or more fastener structures 116 which extends through holes in the sweeper plate 96 and the passage slot 50 in the central portion 44 of the feed shelf. In some embodiments, a pair of the fastener structures 116 may be positioned on opposite sides of the sweeper slot 100 in the sweeper plate, such that the fastener structures 116 and the actuator 76 extend through the passage slot 50 in the shelf. Illustratively, the fastener structure 116 may comprise an assembly of a bolt and a nut, and may further include washers on the bolt and suitably positioned above and/or below the feed shelf to facilitate relatively free movement of the sweeper plate with respect to the shelf within the limits provided by the passage slot 50.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. An animal feeder apparatus having a top, a bottom, opposite ends, and opposite sides, the apparatus being elongated in a longitudinal direction between the opposite ends and having a lateral direction between the opposite sides, the animal feeder apparatus comprising:

a feed hopper defining an interior for receiving a quantity of feed, the feed hopper having an upper opening and a lower feed discharge opening, the feed hopper comprising:
  a pair of hopper walls extending from the upper opening downwardly to the lower feed discharge opening to define opposite sides of the interior of the feed hopper, the pair of hopper walls converging toward each other toward the lower feed discharge opening to form elongated sides of the lower feed discharge opening; and
  a pair of end walls each positioned towards a respective opposite end of the apparatus, the pair of end walls extending between the hopper walls to define opposite ends of the interior of the feed hopper;
a feed shelf located below the feed hopper, the feed shelf having an upper feed support surface with at least a portion of the upper feed support surface being located directly below the feed discharge opening of the feed hopper, the feed shelf being elongated with opposite ends, each end of the feed shelf being positioned adjacent to one of the pair of end walls of the feed hopper, the feed shelf being movable with respect to the feed hopper;
a feed trough located toward the bottom of the apparatus below the feed hopper and below the feed shelf, the feed trough forming a lower feed support surface upon which feed falling from the hopper and the feed shelf rests; and
a pair of diverter walls each positioned towards a respective end wall of the feed hopper, each of the diverter walls being positioned above and adjacent to a respective end of the feed shelf, each of the diverter walls extending upwardly from the feed discharge opening and outwardly toward the respective end wall of the hopper for guiding flow of feed in the interior of the hopper away from the ends of the interior of the hopper, each of the diverter walls being mounted to be stationary with respect to the feed hopper independent of movement of the feed shelf;
wherein the feed shelf is movable with respect to the feed hopper substantially in the longitudinal direction of the feeder apparatus and the feed shelf is movable with respect to the feed hopper in the lateral direction of the feeder apparatus.

2. The apparatus of claim 1 additionally comprising:
a feed shelf movement assembly configured to permit a feeding animal to move the feed shelf from a location adjacent to the lower feed support surface of the feed trough; and
wherein the feed shelf movement assembly is configured to move the feed shelf in the longitudinal direction of the feeder apparatus.

3. The apparatus of claim 1 additionally comprising:
a feed shelf movement assembly configured to permit a feeding animal to move the feed shelf from a location adjacent to the lower feed support surface of the feed trough; and
wherein the feed shelf movement assembly is configured to permit movement of the feed shelf without requiring a feeding animal to directly contact the feed shelf.

4. The apparatus of claim 1 additionally comprising:
a feed shelf movement assembly configured to permit a feeding animal to move the feed shelf from a location adjacent to the lower feed support surface of the feed trough; and
wherein the feed shelf movement assembly is actuatable by the feeding animal while consuming feed from the lower feed support surface of the feed trough.

5. The apparatus of claim 1 additionally including a feed shelf movement assembly comprising at least one actuator movable with respect to the feed trough, the at least one actuator extending through the feed shelf.

6. The apparatus of claim 5 wherein the at least one actuator is movably mounted on the feed hopper.

7. The apparatus of claim 6 wherein the at least one actuator is pivotally mounted on the feed hopper.

8. The apparatus of claim 1 wherein each of the diverter walls forms an end of the feed discharge opening of the feed hopper.

9. The apparatus of claim 1 wherein each of the diverter walls extends downwardly and inwardly with respect to an adjacent and wall to guide feed in the interior of the feed hopper away from the ends of the feed shelf and toward a medial portion of the upper feed support surface of the feed shelf.

10. The apparatus of claim 1 wherein each of the hopper walls has a neck portion forming a necked section of the interior of the feed hopper, each diverter wall being positioned in the neck portion of the interior of the hopper to narrow the necked portion of the interior toward the feed discharge opening.

11. The apparatus of claim 1 wherein each of the diverter walls has a lower end positioned proximate to the upper feed support surface of the feed shelf.

12. An animal feeder apparatus having a top, a bottom, opposite ends, and opposite sides, the apparatus being elongated in a longitudinal direction between the opposite ends and having a lateral direction between the opposite sides, the animal feeder apparatus comprising:
a feed hopper defining an interior for receiving a quantity of feed, the feed hopper having an upper opening and a lower feed discharge opening, the feed hopper comprising:
  a pair of hopper walls extending from the upper opening downwardly to the lower feed discharge opening to define opposite sides of the interior of the feed hopper, the pair of hopper walls converging toward each other toward the lower feed discharge opening to form elongated sides of the lower feed discharge opening; and
  a pair of end walls each positioned towards a respective opposite end of the apparatus, the pair of end walls extending between the hopper walls to define opposite ends of the interior of the feed hopper;
a feed shelf located below the feed hopper, the feed shelf having an upper feed support surface with at least a portion of the upper feed support surface being located directly below the feed discharge opening of the feed hopper, the feed shelf being elongated with opposite ends, each end of the feed shelf being positioned adjacent to one of the pair of end walls of the feed hopper;
a feed trough located toward the bottom of the apparatus below the feed hopper and below the feed shelf, the feed trough forming a lower feed support surface upon which feed falling from the hopper and the feed shelf rests;
a pair of diverter walls each positioned towards a respective end wall of the feed hopper and above a respective end of the feed shelf, each of the diverter walls extending upwardly from the feed discharge opening and outwardly toward the respective end wall of the hopper for guiding flow of feed in the interior of the hopper away from the ends of the interior of the hopper; and a feed shelf movement assembly comprising at least one actuator movable with respect to the feed trough, the at least one actuator extending through the feed shelf.

13. The apparatus of claim 12 wherein the feed shelf is movable with respect to the feed hopper substantially in the longitudinal direction of the feeder apparatus.

14. The apparatus of claim 13 wherein the feed shelf is movable with respect to the feed hopper in the lateral direction of the feeder apparatus.

15. The apparatus of claim 12 wherein the at least one actuator is movably mounted on the feed hopper.

16. The apparatus of claim 15 wherein the at least one actuator is pivotally mounted on the feed hopper.

17. An animal feeder apparatus having a top, a bottom, opposite ends, and opposite sides, the apparatus being elongated in a longitudinal direction between the opposite ends and having a lateral direction between the opposite sides, the animal feeder apparatus comprising:

a feed hopper defining an interior for receiving a quantity of feed, the feed hopper having an upper opening and a lower feed discharge opening, the feed hopper comprising:

a pair of hopper walls extending from the upper opening downwardly to the lower feed discharge opening to define opposite sides of the interior of the feed hopper, the pair of hopper walls converging toward each other toward the lower feed discharge opening to form elongated sides of the lower feed discharge opening; and a pair of end walls each positioned towards a respective opposite end of the apparatus, the pair of end walls extending between the hopper walls to define opposite ends of the interior of the feed hopper, the end walls extending downwardly from the lower feed discharge of the feed hopper;

a feed shelf located below the lower feed discharge opening of the feed hopper and between the end walls, the feed shelf having an upper feed support surface with at least a portion of the upper feed support surface being located directly below the feed discharge opening of the feed hopper, the feed shelf being elongated with opposite ends, each end of the feed shelf being positioned adjacent to one of the pair of end walls of the feed hopper, the feed shelf being movable between the end walls of the feed hopper in the longitudinal direction and in the lateral direction with respect to the feed hopper;

a feed trough located toward the bottom of the apparatus below the feed hopper and below the feed shelf, the feed trough forming a lower feed support surface upon which feed falling from the hopper and the feed shelf rests; and wherein the feed shelf includes a pair of end skirts with each end skirt being positioned at one of the opposite ends of the feed shelf, each of the end skirts extending upwardly with respect to the upper feed support surface of the feed shelf to resist movement of feed on the upper feed support surface off of the ends of the feed shelf and into a gap formed between the ends of the feed shelf and the end walls of the hopper by movement of the feed shelf.

18. The apparatus of claim 17 additionally comprising a pair of diverter walls each positioned towards a respective end wall of the feed hopper, each of the diverter walls extending upwardly from the feed discharge opening and outwardly toward the respective end wall of the hopper for guiding flow of feed in the interior of the hopper onto the upper feed support surface of the feed shelf between the end skirts of the feed shelf.

19. The apparatus of claim 18 wherein each of the diverter walls is mounted on the hopper walls of the feed hopper in a manner to be stationary with respect to the hopper walls and end walls of the feed hopper and independent of any movement of the feed shelf.

20. The apparatus of claim 17 wherein each of the hopper walls has a lower edge, the lower edge having a dog-eared edge portion providing clearance for the end skirt of the feed shelf as the feed shelf moves with respect to the feed hopper.

21. The apparatus of claim 20 wherein a central edge portion of the lower edge of the hopper wall is positioned between the dog-eared portions of the lower edge, the central edge portion being substantially horizontally oriented, each of the dog-eared edge portions extending upwardly and outwardly from the central portion of the lower edge.

* * * * *